United States Patent
Platt et al.

(10) Patent No.: US 12,534,834 B2
(45) Date of Patent: Jan. 27, 2026

(54) SYSTEMS AND METHODS FOR MAKING FIBROUS MATERIALS

(71) Applicants: DelStar Technologies, Inc., Middletown, DE (US); LMS Technologies, Inc., Bloomington, MN (US)

(72) Inventors: Andew G. Platt, Middletown, DE (US); Lenny Pompeo, Middletown, DE (US); Yasar Kiyak, Middletown, DE (US); Andrew Scarff, Middletown, DE (US)

(73) Assignees: DelStar Technologies, Inc., Alpharetta, GA (US); LMS Technologies, Inc., Bloomington, MN (US)

(*) Notice: Subject to any disclaimer, the term of this patent is extended or adjusted under 35 U.S.C. 154(b) by 186 days.

(21) Appl. No.: 18/297,247

(22) Filed: Apr. 7, 2023

(65) Prior Publication Data

US 2023/0323576 A1    Oct. 12, 2023

Related U.S. Application Data

(60) Provisional application No. 63/329,162, filed on Apr. 8, 2022.

(51) Int. Cl.
*D04H 1/413* (2012.01)
*B01D 39/16* (2006.01)
(Continued)

(52) U.S. Cl.
CPC ......... *D04H 1/413* (2013.01); *B01D 39/1623* (2013.01); *D04H 1/4226* (2013.01);
(Continued)

(58) Field of Classification Search
CPC .. D04H 1/413; D04H 1/43828; D04H 1/4226; D04H 1/4291; D04H 1/435;
(Continued)

(56) References Cited

U.S. PATENT DOCUMENTS

| 3,963,392 A | 6/1976 | Goyal |
| 4,406,950 A | 9/1983 | Roesel, Jr. |

(Continued)

FOREIGN PATENT DOCUMENTS

| CN | 108004628 B | * 4/2021 | ............... D01H 4/32 |
| EP | 2419203 B1 | 8/2020 | |

(Continued)

OTHER PUBLICATIONS

Liu et al., "Study on Stabilized of Poly (Vinyl Alcohol) Nanofibers Based Sandwich Structure Purification Material"; Advanced Materials research, vols. 535-537 (Jun. 2012), p. 473-476 (the entire document, and more specifically: p. 476, para 2; figures 6a-6b; abstract; title).

(Continued)

*Primary Examiner* — Alison L Hindenlang
*Assistant Examiner* — Erica Hartsell Funk
(74) *Attorney, Agent, or Firm* — Farber LLC

(57) ABSTRACT

Systems, devices and methods are provided for producing fibrous materials and products, such as filters. A system comprises a first device for generating one or more fiber stream(s), and a second device for isolating nanoparticles within a gaseous medium. The second device forms the nanoparticles into a stream and feeds this stream into the fiber streams to form the fibrous material. This distributes the nanoparticles more uniformly throughout the fibrous material. In addition, the nanoparticles increase the overall surface area within the material, which, in certain applications, increases its filtration efficiency and allows for the (Continued)

capture of submicron contaminants without significantly compromising other factors, such as pressure drop through the filter. Filters produced with these systems and methods are capable of withstanding rigorous conditioning, which allows the filter to achieve substantially the same level of filtration performance throughout the lifetime of the filter.

20 Claims, 20 Drawing Sheets

(51) Int. Cl.
| | |
|---|---|
| D04H 1/4226 | (2012.01) |
| D04H 1/4291 | (2012.01) |
| D04H 1/435 | (2012.01) |
| D04H 1/4382 | (2012.01) |
| D04H 1/587 | (2012.01) |
| D04H 1/64 | (2012.01) |
| D04H 1/72 | (2012.01) |

(52) U.S. Cl.
CPC ........... *D04H 1/4291* (2013.01); *D04H 1/435* (2013.01); *D04H 1/43828* (2020.05); *D04H 1/587* (2013.01); *D04H 1/64* (2013.01); *D04H 1/72* (2013.01); *B01D 2239/0216* (2013.01); *B01D 2239/025* (2013.01); *B01D 2239/0258* (2013.01); *B01D 2239/0435* (2013.01); *B01D 2239/0622* (2013.01); *B01D 2239/10* (2013.01); *D10B 2505/04* (2013.01)

(58) Field of Classification Search
CPC . D04H 1/587; D04H 1/64; D04H 1/72; B01D 39/1623; B01D 2239/0216; B01D 2239/025; B01D 2239/0258; B01D 2239/0435; B01D 2239/0622; B01D 2239/10; D10B 2505/04

See application file for complete search history.

(56) References Cited

U.S. PATENT DOCUMENTS

| | | | |
|---|---|---|---|
| 4,532,169 | A | 7/1985 | Carley |
| 5,401,693 | A | 3/1995 | Bauer et al. |
| 5,656,368 | A | 8/1997 | Braun et al. |
| 5,972,808 | A | 10/1999 | Groeger et al. |
| 6,169,045 | B1 | 1/2001 | Pike et al. |
| 6,338,814 | B1 | 1/2002 | Hills |
| 6,520,426 | B2 | 2/2003 | Huffman |
| 6,616,435 | B2 | 9/2003 | Lee et al. |
| 6,743,273 | B2 | 6/2004 | Chung et al. |
| 6,861,142 | B1 | 3/2005 | Wilkie et al. |
| 6,972,104 | B2 | 12/2005 | Haynes et al. |
| 7,252,493 | B1 | 8/2007 | Johnston et al. |
| 7,300,272 | B1 | 11/2007 | Haggard |
| 7,309,430 | B2 | 12/2007 | Hills |
| 7,390,760 | B1 | 6/2008 | Chen et al. |
| 7,422,071 | B2 | 9/2008 | Wilkie et al. |
| 7,432,869 | B2 | 10/2008 | Haggard et al. |
| 7,504,348 | B1 | 3/2009 | Hagewood et al. |
| 7,772,456 | B2 | 8/2010 | Zhang et al. |
| 7,774,077 | B1 | 8/2010 | Ford |
| 8,017,534 | B2 | 9/2011 | Harvey et al. |
| 9,293,750 | B2 | 3/2016 | Yang et al. |
| 9,457,322 | B2 | 10/2016 | Choi et al. |
| 9,522,357 | B2 | 12/2016 | Kwok et al. |
| 9,993,761 | B2 | 6/2018 | Kwok et al. |
| 10,179,842 | B2 | 1/2019 | Gjoka et al. |
| 10,201,836 | B2 | 2/2019 | Jikahara et al. |
| 10,252,201 | B2 | 4/2019 | Kamiyama |
| 10,799,820 | B2 | 10/2020 | Smithies |
| 11,376,534 | B2 | 7/2022 | Yung et al. |
| 11,491,423 | B2 | 11/2022 | Hacker |

| | | | |
|---|---|---|---|
| 2002/0139746 | A1 | 10/2002 | Koslow |
| 2002/0144942 | A1 | 10/2002 | Denton et al. |
| 2003/0047076 | A1 | 3/2003 | Liu |
| 2003/0186405 | A1 | 10/2003 | Lee et al. |
| 2006/0079145 | A1 | 4/2006 | Cox |
| 2006/0089072 | A1 | 4/2006 | Baker et al. |
| 2006/0264140 | A1 | 11/2006 | Andrady et al. |
| 2007/0021021 | A1 | 1/2007 | Verdegan et al. |
| 2007/0056256 | A1 | 3/2007 | Tepper et al. |
| 2007/0123130 | A1 | 5/2007 | Manuel et al. |
| 2007/0175196 | A1 | 8/2007 | Tepper et al. |
| 2007/0190880 | A1 | 8/2007 | Dubrow et al. |
| 2008/0160856 | A1 | 7/2008 | Chen et al. |
| 2008/0213561 | A1 | 9/2008 | Krins et al. |
| 2008/0217239 | A1 | 9/2008 | Chen et al. |
| 2008/0264259 | A1 | 10/2008 | Leung |
| 2009/0065436 | A1 | 3/2009 | Kalayci et al. |
| 2009/0094954 | A1 | 4/2009 | Nakayama et al. |
| 2009/0165223 | A1 | 7/2009 | Braunecker et al. |
| 2009/0266759 | A1 | 10/2009 | Green |
| 2010/0101413 | A1 | 4/2010 | Jones et al. |
| 2010/0187171 | A1 | 7/2010 | Gupta |
| 2010/0252486 | A1 | 10/2010 | Sato |
| 2010/0275780 | A1 | 11/2010 | Bailey et al. |
| 2010/0296966 | A1 | 11/2010 | Bae et al. |
| 2010/0300054 | A1 | 12/2010 | Cole et al. |
| 2011/0210060 | A1 | 9/2011 | Green et al. |
| 2011/0252970 | A1 | 10/2011 | Jones et al. |
| 2012/0091223 | A1 | 4/2012 | Yi et al. |
| 2012/0152821 | A1 | 6/2012 | Cox et al. |
| 2012/0193282 | A1 | 8/2012 | Wolf et al. |
| 2012/0309246 | A1 | 12/2012 | Tseitlin et al. |
| 2013/0030340 | A1* | 1/2013 | Vincent ............. D04H 1/43828 442/164 |
| 2014/0141336 | A1 | 5/2014 | Morin |
| 2014/0203121 | A1 | 7/2014 | Latta et al. |
| 2014/0255672 | A1 | 9/2014 | Westwood |
| 2014/0260990 | A1 | 9/2014 | Kwok et al. |
| 2014/0262088 | A1 | 9/2014 | Deka |
| 2014/0295090 | A1 | 10/2014 | Tseitlin et al. |
| 2015/0064433 | A1 | 3/2015 | Foster et al. |
| 2016/0015098 | A1 | 1/2016 | Conlon |
| 2016/0214085 | A1 | 7/2016 | Hingorani et al. |
| 2016/0220927 | A1 | 8/2016 | Kwok et al. |
| 2016/0229969 | A1 | 8/2016 | Weisner et al. |
| 2016/0256806 | A1 | 9/2016 | Sanders et al. |
| 2016/0303592 | A1 | 10/2016 | Rice et al. |
| 2017/0065923 | A1 | 3/2017 | Fox et al. |
| 2017/0341004 | A1 | 11/2017 | Miller et al. |
| 2017/0349719 | A1 | 12/2017 | Sumnicht et al. |
| 2018/0070529 | A1 | 3/2018 | Eastin et al. |
| 2018/0178149 | A1 | 6/2018 | Longo et al. |
| 2018/0264386 | A1 | 9/2018 | Drolet et al. |
| 2019/0002283 | A1 | 1/2019 | Zhang et al. |
| 2019/0048500 | A1 | 2/2019 | Tierney et al. |
| 2019/0209962 | A1 | 7/2019 | Meirav et al. |
| 2019/0218099 | A1 | 7/2019 | Huynh |
| 2020/0030731 | A1 | 1/2020 | Dhau et al. |
| 2020/0032438 | A1 | 1/2020 | Chapman |
| 2020/0054975 | A1 | 2/2020 | Belmont et al. |
| 2020/0102676 | A1 | 4/2020 | Carlyle et al. |
| 2020/0122068 | A1 | 4/2020 | Chung et al. |
| 2020/0129972 | A1 | 4/2020 | Ozaki et al. |
| 2020/0179848 | A1 | 6/2020 | Higginson et al. |
| 2020/0216979 | A1 | 7/2020 | Pourdeyhimi et al. |
| 2020/0247675 | A1 | 8/2020 | Schulz et al. |
| 2020/0270787 | A1 | 8/2020 | Pourdeyhimi |
| 2021/0023813 | A1 | 1/2021 | Tsotsis et al. |
| 2021/0070976 | A1 | 3/2021 | Fritze et al. |
| 2021/0095419 | A1 | 4/2021 | Dombrow, Jr. |
| 2021/0121804 | A1 | 4/2021 | Smithies et al. |
| 2021/0324244 | A1 | 10/2021 | Bieber et al. |
| 2021/0387123 | A1 | 12/2021 | Inoue et al. |
| 2022/0088536 | A1 | 3/2022 | Dhau et al. |
| 2022/0274040 | A1 | 9/2022 | Chen et al. |
| 2022/0362696 | A1 | 11/2022 | Cho et al. |
| 2023/0089270 | A1 | 3/2023 | Nag |
| 2023/0090532 | A1 | 3/2023 | Zinn et al. |
| 2023/0321568 | A1 | 10/2023 | Platt et al. |

(56) References Cited

U.S. PATENT DOCUMENTS

| | | |
|---|---|---|
| 2023/0321569 A1 | 10/2023 | Platt et al. |
| 2023/0321571 A1 | 10/2023 | Platt et al. |
| 2023/0321575 A1 | 10/2023 | Platt et al. |
| 2023/0330585 A1 | 10/2023 | Ramamoorthy et al. |
| 2024/0091689 A1 | 3/2024 | Bland et al. |
| 2024/0100455 A1 | 3/2024 | Platt et al. |
| 2025/0041807 A1 | 2/2025 | Platt et al. |

FOREIGN PATENT DOCUMENTS

| | | | |
|---|---|---|---|
| JP | 2017080704 A | | 5/2017 |
| WO | 2004098753 A2 | | 11/2004 |
| WO | 2007/109304 A2 | | 9/2007 |
| WO | 2008077372 A2 | | 7/2008 |
| WO | 2010006784 A1 | | 1/2010 |
| WO | 2021/011217 A1 | | 1/2021 |
| WO | 2021158726 A1 | | 8/2021 |
| WO | 2021/184111 A1 | | 9/2021 |
| WO | 2021/203068 A1 | | 10/2021 |
| WO | 2022/011689 A1 | | 1/2022 |

OTHER PUBLICATIONS

International Search Report and Written Opinion; International Application No. PCT/US2023/017937; Aug. 15, 2023.
International Search Report and Written Opinion; International Application No. PCT/US2023/017953; Aug. 15, 2023.
International Search Report and Written Opinion; International Application No. PCT/US2023/017955; Aug. 15, 2023.
International Search Report and Written Opinion; International Application No. PCT/US2023/017921; Aug. 25, 2023.
International Search Report and Written Opinion; International Application No. PCT/US2023/017962; Aug. 25, 2023.
International Search Report and Written Opinion; International Application No. PCT/US2023/017967; Aug. 29, 2023.
International Search Report and Written Opinion; International Application No. PCT/US2023/017899; Aug. 30, 2023.
International Search Report and Written Opinion; International Application No. PCT/US2023/017951; Aug. 24, 2023.
International Search Report and Written Opinion; International Application No. PCT/US2023/017958; Aug. 30, 2023.
International Search Report and Written Opinion; International Application No. PCT/US2024/040121; Nov. 27, 2024.
PCT/ISA206 Invitation to Pay Additional Fees; International International Application No. PCT/US2023/017899; Jun. 2, 2023.
PCT/ISA206 Invitation to Pay Additional Fees; International International Application No. PCT/US2023/017921; Jun. 13, 2023.
PCT/ISA206 Invitation to Pay Additional Fees; International International Application No. PCT/US2023/017937; Jun. 12, 2023.
PCT/ISA206 Invitation to Pay Additional Fees; International International Application No. PCT/US2023/017951; Jun. 21, 2023.
PCT/ISA206 Invitation to Pay Additional Fees; International International Application No. PCT/US2023/017953; Jun. 21, 2023.
PCT/ISA206 Invitation to Pay Additional Fees; International International Application No. PCT/US2023/017955; Jun. 12, 2023.
PCT/ISA206 Invitation to Pay Additional Fees; International International Application No. PCT/US2023/017958; Jun. 22, 2023.
PCT/ISA206 Invitation to Pay Additional Fees; International International Application No. PCT/US2023/017962; Jun. 16, 2023.
PCT/ISA206 Invitation to Pay Additional Fees; International International Application No. PCT/US2023/017967; Jun. 22, 2023.
International Search Report and Written Opinion; International Application No. PCT/US2023/017933; Jun. 30, 2023.
International Search Report and Written Opinion; International Application No. PCT/US2023/017939; Jul. 7, 2023.
International Search Report and Written Opinion; International Application No. PCT/US2023/017946; Jun. 29, 2023.

* cited by examiner

SYSTEMS AND METHODS FOR MAKING FIBROUS MATERIALS

CROSS-REFERENCE TO RELATED APPLICATIONS

This application claims the benefit of U.S. Provisional Application Ser. No. 63/329,162, filed Apr. 8, 2022, the complete disclosure of which is incorporated herein by reference for all purposes. This application is also related to commonly assigned, U.S. provisional patent applications Ser. Nos. 63/329,009, 63/328,983, 63/328,998, 63/328,970, 63/328,959, 63/329,018, 63/329,137, 63/329,158, 63/329,146, 63/329,155, 63/329,161 63/329,161 and all filed Apr. 8, 2022, the complete disclosures of which are incorporated herein by reference in their entirety for all purposes.

TECHNICAL FIELD

This description generally relates to systems and methods for making fibrous materials and products containing fibrous materials, such as filter media, that incorporate nanoparticles within the material.

BACKGROUND

Fibrous materials are particularly useful for capturing contaminants in filtration devices due to their fine fiber size. The fibers of the filter media are measured in micrometers and can be formed by spun bond, melt blown, electrospinning, or other techniques. The fine fibers capture and trap contaminants in the filter media as the fluid flows through it.

Two main types of filtration devices incorporating fibrous material include surface filters and depth filters. Surface filters, such as membranes or films, act as a barrier for contaminants which are captured before they enter the media structure. These surface filters typically have a submicron pore size and narrow pore size distribution. Surface filters tend to have relatively high particle capturing efficiency. However, they also have a relatively high pressure drop and a low dust loading capacity. The high pressure drop results in reduced air flow through the filter. The low dust loading capacity significantly reduces the longevity of the filter. As such, surface filters have been used in a limited number of applications in the air filtration industry.

Depth filters are commonly employed in air filtration devices with a moderate to high efficiency, a low pressure drop, and a relatively high dust loading capacity. Conventional residential and commercial air filters, such as HEPA filters, are typically rated by the filter's ability to capture particles between about 0.3 and 10 microns. This rating, referred to as a Minimum Efficiency Reporting Value or MERV is developed by the American Society of Heating, Refrigerating and Air Conditioning Engineers (ASHRAE). The MERV ratings range from 1-16, with higher values indicating higher efficiencies at trapping specific types of particles.

Contaminants have a wide range of sizes. However, contaminants smaller than 1 micron are the most harmful particles for the human body and are relatively difficult to filter. For example, conventional mechanical air filters typically report MERV ratings for fibrous filtration materials of about 8-10. Therefore, these filter media typically do not capture submicron particles, such as viruses and other harmful pathogens.

The filtration industry has focused on two different methods for capturing these submicron particles: electrostatic forces and the utilization of nanoparticles within the filter media. Electrostatic filters are formed by electrostatically charging the fibers within the fibrous material, using triboelectric methods, corona discharge, hydro charging, electrostatic fiber spinning or other known methods. Electrostatic filters are most effective at capturing submicron particles, reasonably effective at capturing particles size between 1 and 3 micron, and minimally effective at capturing larger particles from 3 to 10 micron. Electrostatic fibers are commonly used in many filtration applications such as face masks and high efficiency filters to filter submicron contaminants, such as viruses and others.

One drawback with electrostatic filters is that the electrostatic charge decays over time and with use of the filter. Thus, the efficiency of the filter decreases relatively quickly, reducing its longevity. For example, an electrostatic filter having an initial MERV rating of 13 may lose at least 2-3 points of MERV rating after the electrostatic forces have decayed. This compromises the integrity of the filter and may partially or completely inhibit its ability to capture submicron particles.

Another method for capturing submicron contaminants is the use of nanoparticles in conjunction with the fibers. Filtration systems may employ filter media including relatively large fibers having a diameter measured in micrometers and comparatively smaller nanoparticles. The nanoparticles increase the surface area of the within the media for capturing particles by reducing the overall fiber size within the media. The nanoparticles also tend to collapse on each other, increasing the packing density within the filter media. It has been shown that even a small amount of nanometer sized fibers formed in a layer on a microfiber material can improve the filtration characteristics of the material.

The most common way to incorporate nanoparticles into filter media is to apply a thin layer of continuous nanofibers by electrospinning onto a nonwoven substrate. The nanoparticles typically extend parallel or normal to the face of the bulk filter media layer and provide high efficiency filtering of small particles in addition to the filtering of the larger particles provided by the coarse filter media. For example, U.S. Pat. No. 6,743,273 discloses a filter media wherein a continuous nanofiber layer is deposited on the surface of a substrate. U.S. Pat. No. 10,799,820 also discloses an air filtration media comprising a continuous nanofiber layer on the surface of the filter media.

While existing filter media that incorporate nanoparticles have improved the relative efficiency of these filters, the commercial potential for these filters has been limited in certain applications because the nanoparticles are typically dispersed onto the surface of the nonwoven material. This relatively thin layer of nanoparticles on the surface of the filter provides only limited filtering of particles and has a relatively low dust holding capacity.

While there have been many attempts to incorporate nanomaterials into the filtration media to increase the overall filtration efficiency, these attempts have been limited to so-called "wetlaid" methods. These wetlaid methods involve incorporating shortcut nanofibers into a liquid slurry to separate the entangled nanofibers with the help of surfactants. For example, U.S. Pat. No. 10,252,201 discloses a filter medium made of a mixture of short-cut nanofibers and short-cut coarse fibers formed by a wetlaid method. Similarly, US Patent Application No. 2021/0023813 discloses a method of manufacturing a composite structure consisting of a continuous fiber nonwoven substrate with discontinuous fibers such as carbon nanofibers. This method includes drawing a continuous fiber nonwoven substrate through a slurry of discontinuous fibers in which nanomaterials are embedded into the nonwoven substrate.

While these structures have demonstrated increased efficiency, they suffer from other issues, such as reduced longevity and/or efficiency as the media is subjected to normal use conditions. Moreover, these wetlaid methods have not successfully incorporated nanoparticles uniformly throughout the nonwoven material, which results in clumping of the nanoparticles within the material, thereby further reducing its efficiency and overall dust holding capacity.

What is needed, therefore, are improved systems and methods for manufacturing products containing fibrous materials, such as filter media. It would be particularly desirable to incorporate nanoparticles throughout the fibrous material to thereby improve the performance characteristics of the filter.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems, devices and methods are provided for producing fibrous materials and products comprising fibrous material. The fibrous materials may include a substrate of fibers, such as a sheet, layer, film, apertured film, mesh, netting or other media. The products include nanoparticles bonded to the fibers and incorporated into at least a portion of the substrate.

In one aspect, a system for manufacturing a fibrous material comprises a first device for generating one or more streams of fibers and a second device for isolating nanoparticles within a gaseous medium. The second device disperses the nanoparticles into a stream and feeds this stream into the fiber stream(s) to form the fibrous material.

The second device is configured to convert (e.g., open up, break apart and/or separate) clusters, clumps or other groups of nanoparticles into individual nanoparticles having at least one dimension less than 1 micron. The individual nanoparticles may be generated in any suitable gaseous medium, such as air, helium, nitrogen, oxygen, carbon dioxide and the like. Isolating individual nanoparticles in a gaseous medium and then dispersing them into the fiber stream(s) allows the nanoparticles to be distributed more uniformly throughout the fibrous material and/or the product.

In certain embodiments, the products are filter media and filters, such as air filters, face masks, gas turbine and compressor air intake filters, panel filters and the like. The nanoparticles increase the overall surface area within the filter media, which increases its filtration efficiency and allows for the capture of submicron contaminants without significantly compromising other factors, such as pressure drop (i.e., air flow) through the filter. In addition, the filters produced with the systems and methods described herein are capable of withstanding rigorous conditioning, which allows a filter to achieve the same level of filtration performance throughout the lifetime of the filter.

The system may further include a dispersion device, such as a nozzle, coupled to the second device and configured to substantially uniformly feed the nanoparticles into the fiber stream(s). The fiber streams may be generated with any suitable mechanism known in the art, such as meltblown, spunbond or spunlace, heat-bonded, carded, air-laid, wet-laid, extrusion, co-formed, needlepunched, stitched, hydraulically entangled or the like.

In one embodiment, the system includes a spunbond device for generating the fiber streams. The spunbond device may, for example, include one or more extruders configured to heat and extrude fiber filaments and a spinning block comprising one or more spinnerets coupled to the extruders. The molten filaments are stretched and separated and then layered onto a net to form a web. The stream of nanoparticles may be introduced into the fibers stream(s) before the attenuation zone or before the bonding (consolidation) process.

In another embodiment, the system includes a carding machine for generating the fiber streams. The carding machine may, for example, comprise first and second carding machines disposed in-series with each other. The stream of nanoparticles may be introduced at any point after the first carding line and before the second carding line such that the nanoparticles are sandwiched between two carding fiber webs. After that, all of the fibers including nanoparticles are bonded (nanoparticles are thermally interlocked) together in an air through bonding oven.

In yet another embodiment, the system includes first and second melt blown dies configured to heat fibrous material to a molten state and to extrude the fibrous material to form molten threads of fibrous material. The melt blown dies are aligned to generate first and second fiber streams and combine the first and fiber streams at a formation zone. The nozzle of the fiberization device is preferably aligned to converge the stream of individual nanoparticles with the first and second streams at the formation zone.

In certain embodiments, the second device comprises a housing configured to contain clusters, clumps or other groups of nanofibers, and a pump coupled to the housing. The system further includes one or more passages coupled to the pump and a gaseous medium within the passages. The pump is configured to propel the clusters of nanofibers through, or with, the gaseous medium against one or more surface(s) within the passages at a sufficient velocity and/or momentum to open up, and/or separate the groups of nanofibers into individual nanoparticles having at least one dimension less than 1 micron.

Applicant has discovered that individual nanoparticles can be separated from clusters of nanofibers within a gaseous medium by propelling the clusters of nanofibers into a suitable surface at a sufficient velocity to generate the necessary kinetic energy to break up and separate at least some of these clusters of nanofibers into individual nanoparticles. In certain embodiments, the velocity of the nanoparticles is about 500 feet/minute (fpm) to about 10,000 fpm, preferably about 2,000 fpm to about 6,000 fpm.

In one particular aspect, the system comprises a feeder, such as a hopper or similar device, for introducing macro clusters or clumps of nanofibers into the system and a separator coupled to the feeder and configured to mechanically separate the macro clusters of nanofibers into smaller clusters of nanofibers. The macro clusters may be any suitable size and may, or may not, be entangled with each other.

In embodiments, the system further comprises a source of gas, such as compressed air or another suitable gas, and a pump for drawing the smaller clusters of nanofibers from the separator through one or more passages into the system. The source of compressed air provides the motive fluid to circulate the nanofibers throughout the system and eventually outwards into a suitable dispersion device. The pump may comprise any suitable pump, such as a positive-displacement, a centrifugal, an axial-flow and the like. In one embodiment, the pump comprises an eductor configured to generate a sufficient negative pressure to draw the small clusters of nanofibers from the separator and through the passage into the pump.

The system may further include a source of energy, such as a second pump, second eductor or the like, coupled to the first eductor and configured to propel the small clusters of nanofibers from the first eductor against a surface at a sufficient velocity to break up the nanofibers and convert at least some of the small clusters of nanofibers into individual nanoparticles. The surface may by any surface that opposes the flow of the nanofibers through the passage, such as the inner walls of the passage at a junction point, or other change in direction of the inner walls, e.g., a curved surface, a perpendicular surface or the like. Alternatively, the passage may include walls or other surfaces disposed within the passage, or projecting into the passage in the fluid path. In one embodiment, the passage extends into a substantially T-shaped junction that includes two separate passages extending from the junction. The second eductor is configured to propel the nanofibers into the wall of the T-shaped junction at a velocity sufficient to break apart at least some of the nanofibers.

In certain embodiments, the system further comprises one or more reactors for separating the individual nanoparticles that have already been isolated from the clumps of nanofibers that have not yet been completely broken down. The reactor(s) comprise a housing coupled to the passages and have an internal chamber and a source of negative pressure configured to draw the smaller clusters of nanofibers away from the individual nanoparticles.

In embodiments, the reactor(s) each comprise a substantially central rod or cylinder and one or more inlets located at one end of the internal chamber and substantially surrounding the central rod. The inlets are coupled to the passage(s) such that the clusters of nanofibers and the individual nanoparticles are drawn into the chamber through the inlet(s). The central rod comprises an opening at one end opposite the inlet(s). The opening is coupled to an internal channel within the central rod and has an outlet coupled to a nozzle or other dispersion device. This allows nanoparticles to pass into the reactor through the inlets and then into the central rod and to the dispersion device.

The inlets may be oriented at an angle relative to the central rod such that the nanofibers and nanoparticles enter the internal chamber at a transverse angle relative to the outer surface of the reactor. In a preferred embodiment, at least one or more of the inlets is oriented such that, when the nanofibers and nanoparticles enter the reactor, they are moving in a direction substantially tangential to the central rod. Once they have entered the annular chamber around the rod, the velocity vector (speed and direction) of the nanofibers and nanoparticles creates a vortex within the reactor that causes them to swirl around the central rod from one end to the other. Since the individual nanoparticles are significantly lighter than the entangled nanofibers that are still clustered together, these individual nanoparticles are drawn into the inlet of the central rod. The vortex within the chamber may also further break down (e.g., open up, separate and/or individualize) the clusters of nanofibers as they pass through the reactor.

The reactor may further comprise one or more outlet(s) located on an opposite end of the inlet(s). The larger and heavier clusters of nanofibers that have not yet been broken down are drawn through these outlet(s). Thus, the isolated and individualized nanoparticles are drawn into the nozzle and the clusters of nanofibers are drawn through the outlet. These outlet(s) may be coupled to the first or second pumps, or to additional pumps within the system that are designed to further break up the clusters of nanofibers and recirculate them back into the reactor(s).

In another aspect, a method for isolating individual nanoparticles within a gaseous medium comprises providing a first stream of fibers. The method further includes isolating a second stream of nanoparticles within a gaseous medium and combining the first and second streams to form the fibrous material. The nanoparticles may be generated in any suitable gaseous medium, such as air, helium, nitrogen, oxygen, carbon dioxide and the like.

In embodiments, the method further includes substantially uniformly feeding the nanoparticles into the first stream of fiber and forming a fibrous material from the fiber and nanoparticle streams. The nanoparticles increase the overall surface area within the fibrous material, which increases its filtration efficiency and allows for the capture of submicron contaminants without significantly compromising other factors, such as pressure drop (i.e., air flow) through the filter.

In one embodiment, the fiber streams is generated by heating and extruding fiber filaments. The molten filaments are stretched and separated and then layered onto a net to form a web. The stream of nanoparticles may be introduced into the fiber stream before the attenuation zone or before the bonding (consolidation) process.

In another embodiment, the fiber stream is generating by carding. The carding machine may, for example, comprise first and second carding machines disposed in-series with each other. The stream of nanoparticles may be introduced at any point after the first carding line and before the second carding line such that the nanoparticles are sandwiched between two carding fiber webs. After that, all of the fibers including nanoparticles are bonded (nanoparticles are thermally interlocked) together in an air through bonding oven.

In yet another embodiment, first and second fiber streams are generated by heating fibrous material to a molten state and extruding the fibrous material to form molten threads of fibrous material. The threads are aligned to combine the first and fiber streams at a formation zone. The nozzle of the fiberization device is preferably aligned to converge a third stream of individual nanoparticles with the first and second streams at the formation zone.

In certain embodiments, macro clusters of nanofibers are first mechanically separated from each other to form smaller clusters of nanofibers having a size suitable for advancement through a fiberization device. The fiberization device breaks up the clusters of nanofibers into individual nanoparticles.

The method may further comprise applying negative pressure to the clusters of nanofibers to draw the clusters of nanofibers into a stream of compressed air and propelling the clusters of nanofibers against a surface to break up at least one portion of the clusters of nanofibers into the individual nanoparticles. The surface may, for example, be the inner walls of the passage at a junction point, or other change in direction of the inner walls, e.g., a curved surface, a perpendicular surface or the like. In one embodiment, the nanofibers are propelled into a substantially T-shaped junction that includes two separate passages extending from the junction. The velocity of the nanofibers may be about 500 feet/minute (fpm) to about 10,000 feet/minute, preferably about 2,000 fpm to about 6,000 fpm.

In certain embodiments, the method further comprises separating the individual nanoparticles that have already been isolated from the clumps of nanofibers that have not yet been completely broken down. In these embodiments, the particles (both clumps of nanofibers and individual nanoparticles) are driven into an internal chamber of one or more reactor(s). The particles are separated in the reactor(s) such that the nanoparticles enter the nozzle and the remaining clumps of nanofibers exit the reactor for recirculation through the system. In a preferred embodiment, the particles are propelled into the reactor(s) at angles to a central rod, such that the velocity vector (speed and direction) of the nanofibers and nanoparticles creates a vortex within the reactor that causes them to swirl around the central rod from one end to the other. Since the individual nanoparticles are significantly lighter than the entangled nanofibers that are still clustered together, these individual nanoparticles are drawn into the inlet of the central rod. The vortex within the chamber may further break down (e.g., open up, separate and/or individualize) the clusters of nanofibers as they pass through reactor.

The recitation herein of desirable objects which are met by various embodiments of the present description is not meant to imply or suggest that any or all of these objects are present as essential features, either individually or collectively, in the most general embodiment of the present description or in any of its more specific embodiments.

DETAILED DESCRIPTION OF THE EMBODIMENTS

Figure 1:
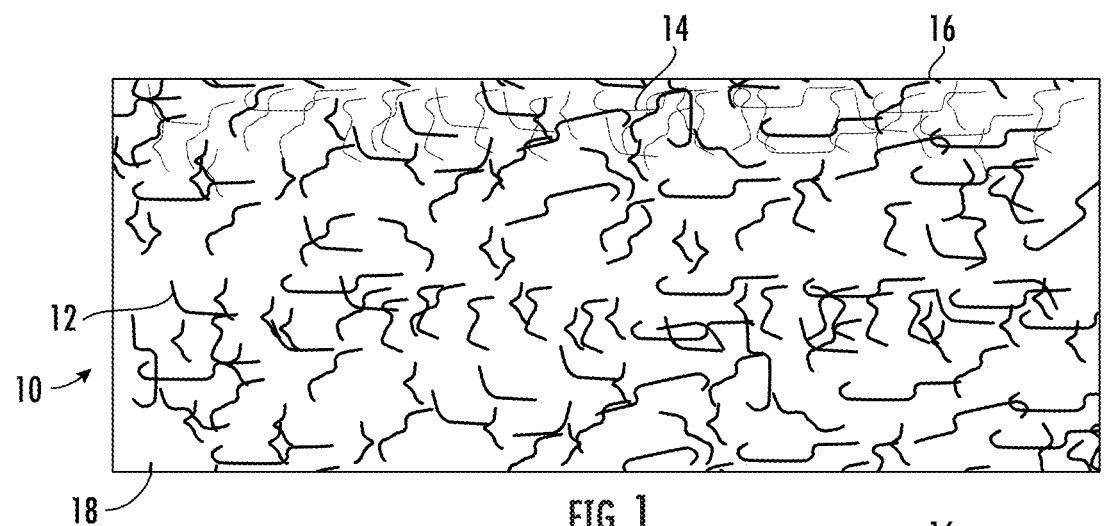
FIG. 1 is a side view of a fibrous material with nanoparticles dispersed into a portion of the material.

This description and the accompanying drawings illustrate exemplary embodiments and should not be taken as limiting, with the claims defining the scope of the present description, including equivalents. Various mechanical, compositional, structural, and operational changes may be made without departing from the scope of this description and the claims, including equivalents. In some instances, well-known structures and techniques have not been shown or described in detail so as not to obscure the description. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Except as otherwise noted, any quantitative values are approximate whether the word "about" or "approximately" or the like are stated or not. The materials, methods, and examples described herein are illustrative only and not intended to be limiting.

Systems, devices and methods are provided for producing fibrous materials and products comprising fibrous material. The fibrous materials may include a substrate of fibers, such as a sheet, layer, film, apertured film, mesh, netting or other media. The products include nanoparticles bonded to the fibers and incorporated into at least a portion of the substrate.

As used herein, the term "nanoparticle" means any particle that has a dimension less than 1 micron in at least one axis or dimension. For example, a fiber having a diameter or width less than a micrometer and a length greater than 1 micrometer is a nanoparticle as used herein.

In certain embodiments, each individual nanoparticle may be a small particle that ranges between about 1 to about 1000 nanometers in size, preferably between about 1 to about 650 nanometers. The particle size of at least half of the particles in the number size distribution may measure 100 nanometers or below. The majority of the nanoparticles will typically be made up of only a few hundred atoms. The material properties change as the size of the nanoparticles approaches the atomic scale. This is due to the surface area to volume ratio increasing, resulting in the material's surface atoms dominating the material performance. Owing to their very small size, nanoparticles have a very large surface area to volume ratio when compared to bulk material, such as powders, plate, sheet or larger fibers. This feature enables nanoparticles to possess unexpected optical, physical and chemical properties, as they are small enough to confine their electrons and produce quantum effects.

In some embodiments, the nanoparticles comprise nanofibers that have at least one dimension less than 1 micron (i.e., diameter, width, height, or the like depending on the cross-sectional shape of the fiber). The nanofibers may have a continuous length, or the nanofibers may have discrete length, such as 1 to 100,000 microns, preferably between about 100 to 10,000 microns.

The fibrous substrate discussed herein may comprise a nonwoven structure of individual fibers or threads which are interlaid, interlocked or bonded together. Nonwoven fabrics may include sheets or web structures bonded together by entangling fiber or filaments (and by perforating films) mechanically, thermally, or chemically. They may be substantially flat, porous sheets that are made directly from separate fibers or from molten plastic or plastic film. Examples of suitable nonwoven materials include, but are not limited to, fibers, layers or webs that are meltblown, spunbond or spunlace, heat-bonded, bonded carded, air-laid, wet-laid, co-formed, needlepunched, stitched, hydraulically entangled or the like.

In certain embodiments, the substrate may comprise a knitted and/or woven material. The knitted material may comprise any knitting pattern suitable for the desired application. Suitable knitted materials for filter applications include weft-knit, warp knit, knitted mesh panels, compressed knitted mesh and the like. Suitable woven materials for filter applications include textile filter media, such as monofilament fabrics, multifilament fabrics, nylon mesh, polyester mesh, polypropylene mesh and the like. Woven textiles may be used in, for example, mesh filter press cloths, woven filter pads and other die cut pieces, centrifuge filter bags, liquid filter bags, dust collector bags, bed dryer bags, rotary drum filters, filter belts, leaf filters, roll media and the like.

In some embodiments, the fibrous material may include a structure comprising shortcut fibers and/or filaments that are intermingled or entangled. A shortcut fiber as used herein means a fiber of finite length. A filament as used herein means a fiber having a substantially continuous length. In some embodiments, the substrate may comprise shortcut coarse, microfibers and/or fine fibers. As used here in a "fine fiber" means fibers having diameter less than 1 micron, a "coarse fiber" means fibers having diameter more than 10 micron, and a microfiber is a synthetic fiber having a diameter of less than 10 microns.

In certain embodiments, the nanoparticles are dispersed "in depth" within the substrate. As used herein, the term "in depth" means that the nanoparticles are dispersed beyond a first surface of the substrate such that at least some of the nanoparticles are disposed between first and second opposing surfaces into the internal structure of the substrate or media. In certain embodiments, the nanoparticles are dispersed throughout substantially the entire media from the first surface to the opposing second surface. In other embodiments, the nanoparticles are dispersed through a portion of the media from the first surface to a location between the first and second surfaces.

In some embodiments, the nanoparticles are distributed three-dimensionally in space relative to the supporting fiber, which may increase fiber surface area and micro-volumes within the fibrous material. The three-dimensional distribution also provides resistance against complete blockage of a particular portion of the fibrous material, which is particularly useful in filter media as it allows fluid (e.g., air and other gases) to pass through the filter, thereby reducing the overall pressure drop across the filter.

In other embodiments, the nanoparticles are disposed in a density gradient across the thickness of the substrate such that a higher density of nanoparticles is disposed near one surface than the opposite surface, or a higher density of nanoparticles is disposed on the surfaces as compares to the middle section of the substrate. The density gradient shown in may be substantially linear, it may reduce in a series of discrete steps, or the gradient may be random (i.e., a generally reduction in density that is not linear or stepped). This density gradient provides a number of advantageous features for certain applications, such as filters (as discussed below).

The nanoparticles may comprise any suitable material, such as glass, biosoluble glass, ceramic materials, acrylic, carbon, metal, such as alumina, polymers (such as nylon, polyethylene terephalate, and the like), polyvinyl chloride (PVC), polyolefin, polyacetal, polyester, cellulous ether, polyalkylene sulfide, poly (arylene oxide), polysulfone, modified polysulfone polymers and polyvinyl alcohol, polyamide, polystyrene, polyacrylonitrile, polyvinylidene chloride, polymethyl methacrylate, polyvinylidene fluoride and any combination thereof.

In some embodiments, nanoparticles may be produced as bicomponent segmented pie and islands in the sea. Then filaments are drawn so much so that submicron filaments are obtained. Continuous filament nanofibers are cut according to desired length, preferably between about 100 to about 10000 microns.

In some embodiments, nanoparticles are absorbents and adsorbents. In some embodiments, nanoparticles are activated carbon fibers or activated carbon powders. In some embodiments, nanoparticles are catalytic particles or catalytic fibers. In some embodiments, nanoparticles can be obtained by feeding a submicron fiber nonwoven in a shredder or a crusher or edge trimmer machine where bonded nonwoven gets in and shortcut fiber comes out. For instance, low weight biocomponent meltblown or nano meltblown fabric can be fed into a shredder and submicron nanoparticles can be obtained.

In some embodiments, different nanoparticles may be mixed. For examples, nanofibers and nanobeads can be mixed. Two different nanofibers with different melting points can also be mixed so that lower melting point nanoparticle can act as binder for higher melting point nanofibers. Nanoparticles with different diameters and different lengths can be mixed as well.

In some embodiments, nanoparticles are chosen from environmentally sustainable raw materials. Nanoparticles may compromise bio soluble glass nanofibers, biodegradable nanoparticles, compostable nanoparticles, or recyclable compositions.

Nanoparticles of different types can be combined. Some of the nanoparticles can be functional nanoparticles. For example, the functional nanoparticles may include activated carbon and/or antimicrobial material deposited onto and/or attached to the fibers in the fibrous material. This may improve the gas absorption efficiency of the fibers and the effectiveness of killing bacteria. In addition, a fibrous product of a microfiber fibrous with nanoparticles of glass and carbon deposited into it would provide filtration and odor-removing functionality as a filter medium.

In some embodiments, the nanoparticles are bonded to the fibers via mechanical entanglement. This mechanical bond can be supplemented with an adhesive or binding agent, as discussed in more detail below. In certain embodiments, the nanoparticles are not crimped (i.e., they do not include significant wavy, bent, curled, coiled sawtooth or similar shape associated with the nanoparticle in a relaxed state. In other embodiments, the nanoparticles may have a crimped body structure with a discrete length. For instance, when these crimped nano-fibers having a discrete length are attached to the fiber they entangle among themselves and also with, onto, and around, the fiber with a firm attachment to form a modified fiber. In other embodiments, the attachment of the nano-fibers to the micron fibers is accomplished via electrostatic charge attraction and/or Van der Waals force attraction between the fibers and the nanoparticles.

Filter media and filters, such as air filters, face masks, gas turbine and compressor air intake filters, panel filters and the like, are also provided that include nanoparticles dispersed in depth within the filter media. In some embodiments, the filters include one or more support layers bonded to the filter media. The support layers and/or the filter media may include nanoparticles dispersed in depth within the layer(s). In some embodiments, polymer layers, membranes or films are provided that include one or more apertures for flow of gas or liquid therethrough with nanoparticles disposed in depth within the polymer layer. In other embodiments, the fibrous material comprises a flexible surface layer for a finger bandage pad, a face mask or the like.

Systems, devices and methods are provided herein for producing the fibrous material and the products containing the fibrous material (e.g., gas filters). Systems and methods are also provided for isolating individual nanoparticles in a gaseous medium, such as air, helium, nitrogen, oxygen, carbon dioxide and the like (instead of a liquid) and are capable of being dispersed into another product, film, layer or substrate via a gas stream, aerosol, vaporizer, spray or other suitable delivery mechanism.

While the following description is primarily presented with respect to fibrous material and filter media, it should be understood that devices and methods disclosed herein may be readily adapted for use in a variety of other applications. For example, the fibrous material disclosed herein may be useful in household cleaning products, roofing and flooring products, automobile upholstery and headliners, reusable bags, wallcoverings, filtration devices, insulation and the like. In addition, the individual nanoparticles that are isolated and generated in the processes described herein may be utilized in various coatings, composites and/or additives in, for example, polymers, food packaging, flame retardants, fuel cells, batteries, capacitors, nanoceramics, lights, material fabrication, manufacturing methods, reinforcement for composites, cement and other materials, medical diagnostic applications, medical therapeutic devices or therapies, tissue engineering, such as scaffolds for bone or tissue repair, potable waters, industrial process fluids, food and beverage products, pharmaceutical and biological agents, tissue imaging, medical therapy delivery, environmental applications, such as biodegradable compounds and the like.

FIG. 1 illustrates a fibrous material or substrate 10 that includes a plurality of fibers 12 and nanoparticles 14. Substrate 10 has a first surface 16 and a second surface 18 opposing the first surface 16 and defined a width or thickness between first and second surfaces 16, 18. The nanoparticles 14 have been deposited into the substrate through first surface 16. As shown, nanoparticles 14 penetrate through first surface 16 into the "depth" of the substrate 10 between the first and second surfaces 16, 18. In some embodiments, the nanoparticles 14 penetrate from the first surface at least 25% of the width or thickness between the first and second surfaces 16, 18, or more preferably at least about 50% of the thickness. In other embodiments, the nanoparticles 14 penetrate substantially throughout the substrate 10 from first surface 16 to second surface 18.

Figure 24A:
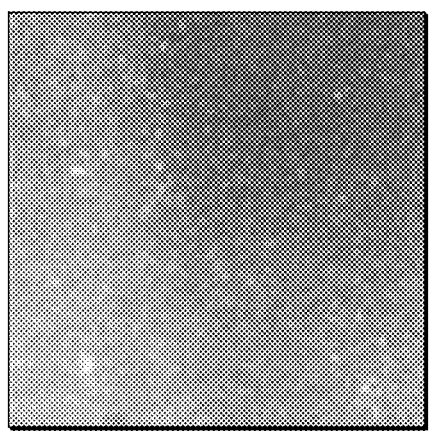
FIG. 24A is a photograph of a fibrous material with nanoparticles dispersed in clumps or clusters throughout the material.
Figure 24B:
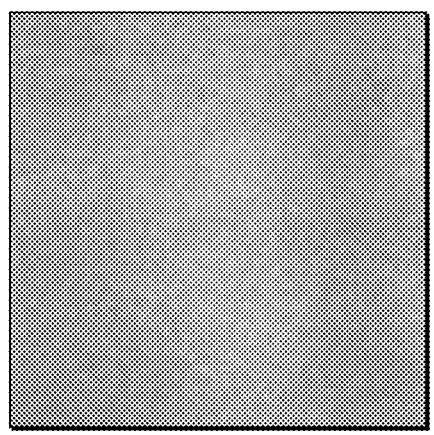
FIG. 24B is a photograph of a fibrous material with nanoparticles dispersed substantially uniformly throughout the material.

The nanoparticles 14 preferably comprise individual nanoparticles that have been broken up, separated and isolated from each other prior to dispersion into substrate 10 (as shown in FIG. 24B). As such, the nanoparticles 14 are not present in the fibrous product in a layer, and do not have significant clumping or bundles of nanofibers (as shown in FIG. 24A). This provides a greater dispersion of nanoparticles throughout the substrate, which in some applications, such as gas filters, provides a more efficient filtering capacity for filtering out contaminants. In addition, this provides a fibrous material with a greater area density of nanoparticles in grams per square meter (gsm) within the material or "add-on amount". The term "add-on amount" is used herein to mean the area density (gsm) of a material, fiber or particle in a thin layer, sheet or film of material.

In certain embodiments, the nanoparticles may comprise an add-on amount of about 0.1 grams/m$^2$ to about 20 grams/m$^2$, preferably at least about 2.0 grams/m$^2$. The specific add-on amount or area density may depend on the application. For example, Applicant has found that a higher area density or add-on amount will increase the efficiency of the fibrous material in filtering out contaminants. Thus, the specific add-on amount of nanoparticles may depend on the desired efficiency of a filter media.

Figure 2:
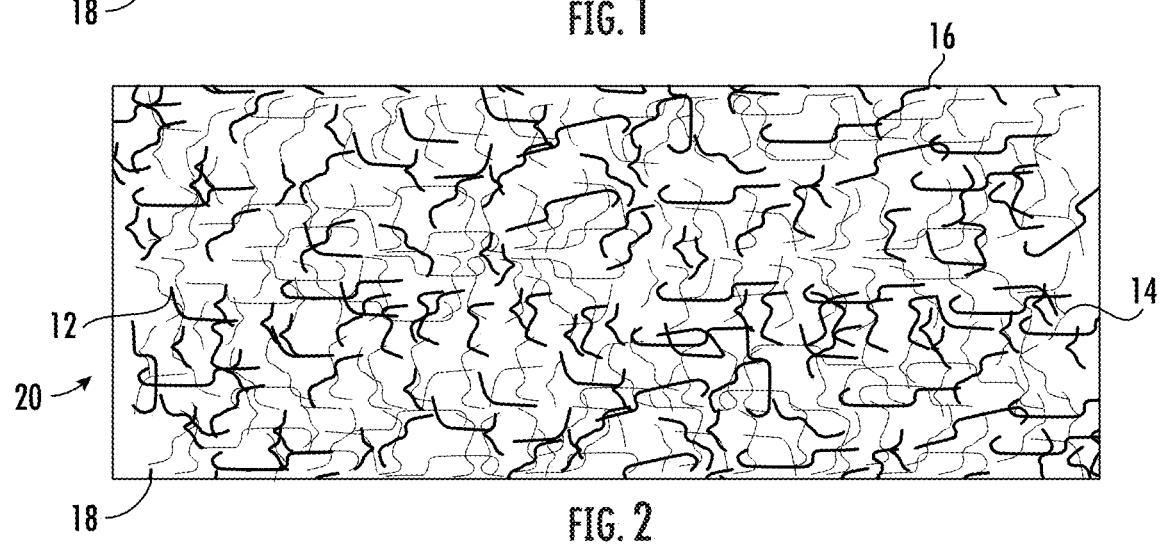
FIG. 2 is a side view of a fibrous material with nanoparticles dispersed throughout the material.

FIG. 2 illustrates a fibrous material or substrate 20 that includes a plurality of fibers 12 and nanoparticles 14. As shown, nanoparticles 14 penetrate throughout the entire width of substrate 20 from first surface 16 to second surface 18. In certain embodiments, the nanoparticles 14 are substantially dispersed throughout the fibers 12 of substrate, as shown in FIG. 2. In certain embodiments, the density of nanoparticles located at first surface 16 differs by less than 50% of the density of nanoparticles dispersed within the central portion of substrate 20 between surfaces 16, 18. In some embodiments, this difference is less than 25%, preferably less than 10%. In certain embodiments, the amount or number of individual nanoparticles dispersed within the central portion of substrate 20 is at least about 50% of the amount of individual nanoparticles dispersed at or near first surface 16, preferably at least about 75% and more preferably at least about 90%.

Figure 3:
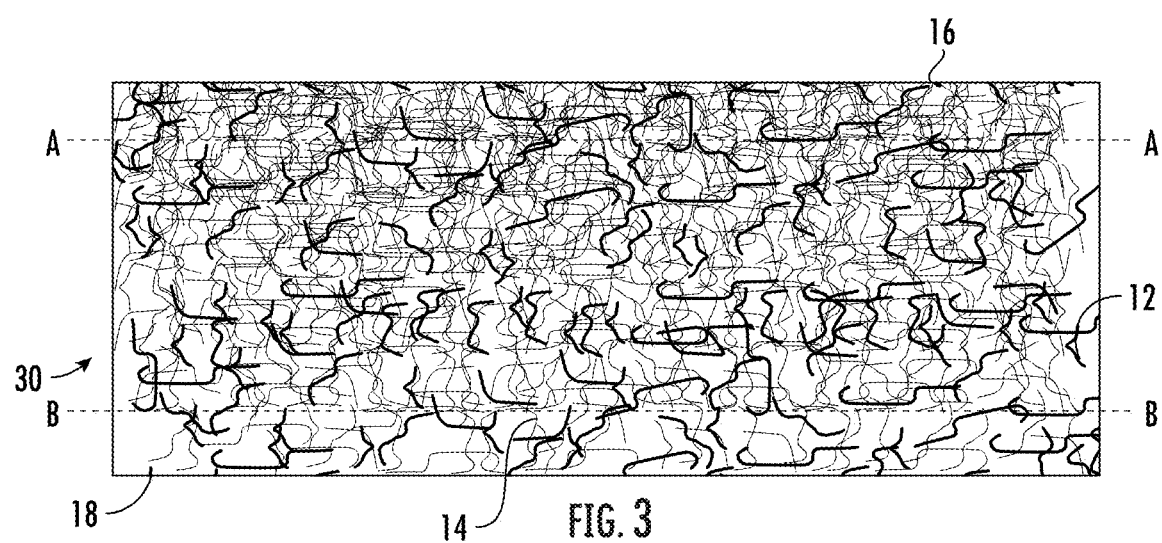
FIG. 3 is a side view of a fibrous material with nanoparticles dispersed in a gradient through the material.

In other embodiments, nanoparticles 14 are disposed in a density gradient from first surface 16 to second surface 18. For example, FIG. 3 illustrates a substrate 30 wherein the nanoparticles 14 form a density gradient with a higher density of nanoparticles 14 disposed near first surface 16 than second surface 18. In certain embodiments, the density of nanoparticles located at first surface 16 differs by greater than about 75% of the density of nanoparticles dispersed at second surface 18. In some embodiments, this difference is greater than 50%. In some embodiments, the difference is greater than 25%. In certain embodiments, the amount or number of individual nanoparticles dispersed at or near second surface 18 is less than about 50% of the amount of individual nanoparticles dispersed at or near first surface 16, preferably less than about 25% and more preferably less than about 10%.

The density gradient shown in FIG. 3 may be substantially linear from first surface 16 to second surface 18. Alternatively, the density of the nanoparticles 14 may reduce from first surface 16 to second surface 18 in a series of discrete steps, or the gradient may be random (i.e., a generally reduction in density that is not linear or stepped).

In other embodiments, the nanoparticles may be added into the substrate from both the first and second surfaces 16, 18. In these embodiments, the area density or "add-on amount" at first and second surfaces 16, 18 may be substantially equal to each other, or they may be different depending on the application. In these embodiments, the area density or "add-on amount" that is present in the middle of the substrate is lower than at surfaces 16, 18. For example, the area density in the middle of the substrate may be about 75% of the area density at surfaces 16, 18, or it may be about 50%, 40% or 25%.

The distribution of nanoparticles across the thickness of the fibrous material can be measured, for example, using imaging techniques. A magnified view of the fibrous product, using an electron microscope or other techniques, taken at a horizontal section of the product at the middle of the thickness of the product can be compared to an image taken at the upper or lower surface of the product, or all three images can be compared, to determine the extent to which the amount of nanoparticles deposited varies. Computerized image analysis processing can be employed. For example, in FIG. 3, a section can be taken at line A-A and a section can be taken at B-B. A top view image of each section can be taken through electron microscope, scanning electron microscopy, and other microscopes. A top view image of the section taken at section A-A, for example, can be compared to a top view image taken at section B-B. The number of microfibers, the number of nanoparticles, or both, in samples of the same two-dimensional size can be assessed and compared. In addition, imaging techniques can be used on three dimensional samples. These techniques can be used to assess the orientation of fibers and other characteristics. These techniques can be used to determine that nanoparticles have been deposited into the depth of the substrate, have been deposited substantially across a significant portion of the substrate, substantially across the entire depth, or across some portion of the depth of the substrate.

The contemplated fibers of the substrate can be manufactured by any method, including, without limitation, the air laid method, spinneret, gel spinning, melt spinning, wet spinning, dry spinning, islands-in-a sea staple or spunbond, segmented pie staple or spunbond, and others. Such methods are described in U.S. Pat. Nos. 4,406,950, 6,338,814, 6,616,435, 6,861,142, 7,252,493, 7,300,272, 7,309,430, 7,422,071, 7,431,869, 7,504,348, 7,774,077 9,522,357, 9,993,761 and US Patent Publication No. 2009/266,759, the completed disclosures of which are hereby incorporated herein by reference for all purposes.

The fibers contemplated may have many shapes in cross-section, including without limitation, circular, kidney bean, dog bone, trilobal, barbell, bowtie, star, Y-shaped and others. These shapes and/or other conventional shapes may be used with the embodiments to obtain the desired performance characteristics. The fibers in the substrate stay connected to each other through thermal bonds, chemical bonds, by being entangled with one another, through the use of binding agents, such as adhesives, or the like.

The fibers may be artificial or natural fibers. Suitable materials for the fibers include, but are not limited to, polypropylene, polyesters (PET), PEN polyester, PCT polyester, polypropylene, PBT polyester, co-polyamides, polyethylene, high density polyethylene ("HDPE"), LLDPE, cross-linked polyethylene, polycarbonates, polyacrylates, polyacrylonitriles, polyfumaronitrile, polystyrenes, styrene maleic anhydride, polymethylpentene, cyclo-olefinic copolymer or fluorinated polymers, polytetrafluoroethylene, perfluorinated ethylene and hexfluoropropylene or a copolymer with PVDF like P(VDF-TrFE) or terpolymers like P(VDF-TrFE-CFE), propylene, polyimides, polyether ketones, cellulose ester, nylon and polyamides, polymethacrylic, poly(methyl methacrylate), polyoxymethylene, polysulfonates, acrylic, styrenated acrylics, pre-oxidized acrylic, fluorinated acrylic, vinyl acetate, vinyl acrylic, ethylene vinyl acetate, styrene-butadiene, ethylene/vinyl chloride, vinyl acetate copolymer, latex, polyester copolymer, carboxylated styrene acrylic or vinyl acetate, epoxy, acrylic multipolymer, phenolic, polyurethane, cellulose, styrene or any combination thereof. Other conventional fiber materials are contemplated.

The fibers may include fibers of different sizes, with the fibers generally having diameters ranging from about 1 to about 1000 microns with lengths ranging from about one half to three inches. The fibers may be configured as a gradient density media in which the pore size decreases from the upper surface of the filter (upstream) to the lower surface (downstream) to increase capture efficiency and dust holding capacity. This configuration also allows for the dispersion of different amounts of nanoparticles to the filter media at different depths. For example, the upstream side of the filter media may have the largest fiber size to allow for more void space and a greater density of nanoparticles, while the downstream side of the filter media has fibers with smaller sizes to provide a lower density of nanoparticles. Alternatively, this structure may be reversed to provide a greater density of nanoparticles in the downstream portion of the filter media.

The fibers in the media may stay connected to other fibers by being thermally-bonded, chemically-bonded or entangled with one another. Bicomponent fibers may be used, particularly with mechanical filtration, and these are formed by extruding two polymers from the same spinneret with both polymers contained within the same filament. Suitable materials for bicomponent fibers include, but are not limited to, polypropylene (PP)/polyethylene (PE), polyethylene terephthalate (PET)/polypropylene (PP) and the like.

Figures 5A, 5B, 5C:
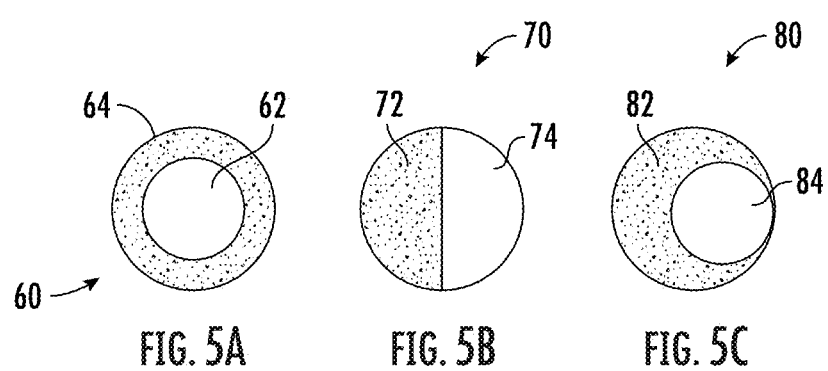
FIGS. 5A-5C illustrate biocomponent fibers incorporated into a fibrous material.

In some embodiments, the substrate may comprise a "high loft" fibrous material comprising spunbond or air through bonded carded nonwoven fibers. As used here in the term "high loft" means that the volume of void space is greater than volume of the total solid. In air through bonded carded nonwoven fibers, the loftiness of a substrate can be controlled by various means known to those of skill in the art. For example, loftiness can be increased by applying less compression force onto the media during bonding. In another example, a high loft nonwoven material can be manufactured with fibers having larger thicknesses, such as thicknesses greater than 3 denier, e.g., 5 denier or greater, 6 denier or greater (discussed in more detail below). In other embodiments, the loftiness may be increased by using eccentric biocomponent fibers, as shown in FIG. 5C and discussed in more detail below.

In certain embodiments, the fibers may include a silicone-based coating to improve the efficiency of the filter media at capturing contaminants, particularly contaminants in the E2 and E3 particle group range. The silicone-based coating may comprise a reactive silicone macroemulsion. The silicone emulsion may comprise, for example, dimethyl silicone emulsions, amino type silicone emulsions, organo-functional silicone emulsions, resin type silicone emulsions, film-forming silicone emulsions, or the like. In one embodiment, the reactive silicone macroemulsion comprises an amino functional polydimethylsiloxane and/or a polyethylene glycol monotridecyl ether. Suitable silicone coatings are described in commonly assigned U.S. Provisional Patent Application Ser. No. 63/406,686, filed Sep. 14, 2022, the complete disclosure of which is incorporated herein by reference.

The filtration media may comprise a charge additive to modify the triboelectric charge of the fibers and increase the stability and/or duration of the triboelectric charge in the filter. This increases the overall filtration efficiency of the filter without compromising other important characteristics of the filters, such as longevity, dust holding capacity, and the pressure drop or air flow through the filter. Suitable charge additives for triboelectric charging are described in commonly assigned Provisional Patent Application Ser. No. 63/410,731, filed Sep. 28, 2022, the entire disclosures of which are hereby incorporated by reference herein for all purposes.

The fibers may have thicknesses that are suitable for the application. In some embodiments, the fibers have at least one dimension in the range of about 1 to about 10,000 micrometers or about 1 to about 1,000 micrometers or about 10 to 100 micrometers. The thickness of the fibers may also be measured in denier, which is a unit of measure in linear mass density of fibers. In some embodiments, the fibers may have a linear density of about 1 denier to about 10 denier. The nanoparticles are fibers having at least one dimension in the range of about 1 to about 1,000 nanometers or about 1 to about 100 nanometers. The dimensions described above fibers and nanoparticles may be a diameter or a width, depending on the shape of the fiber or nanoparticle.

For gas filters, such as pleated or unpleated air filters, the fibers may have a linear density in the range of about 1 denier to about 10 denier. The filter media may comprise fibers with the same or different linear densities.

Fibers in air filters typically have a linear density of about 3 denier or less to ensure that the fibers are small enough to capture contaminants passing through the filter. Applicant has surprisingly found that with the use of nanoparticles dispersed through the filter media, the fibers may have larger linear densities, e.g., greater than 3 denier. This is because the nanoparticles provide a significant filtering capability. In some cases, the fibers may have linear densities of greater than 3 denier, 5 denier or greater, 6 denier or greater or as large as 7-10 denier.

Applicant has also found that, in some applications, fibers with larger linear densities than used in conventional filters (e.g., greater than about 3 denier) provide more open space or pores within the filter media, which allows for a greater density of nanoparticles to be dispersed therein. While this may be counterintuitive to those of skill in the art, Applicant has discovered that fibers with larger linear densities that incorporate nanoparticles actually improves the overall efficiency of the filter.

In certain embodiments, a filter media may include at least two different fiber thicknesses or linear densities to provide at least two different layers of filter within the same filter media. For example, in some cases, one portion of the filter media will include fibers with linear densities greater than 3 denier, for example, 5 denier or greater or 6 denier or greater. The other portion of the filter media will comprise fibers with more standard linear densities of 3 denier or less. This dual-layer filter media creates a first filter portion that filters contaminants primarily with nanoparticles that have a high density within the larger thickness fibers and a second filter portion that filters contaminants primarily with the fibers having lower linear densities, although both portions may include nanoparticles dispersed throughout the fibers. In certain embodiments, the filter media may include three or more separate portions or layers with different denier fiber ranges within each portion.

Figure 4:
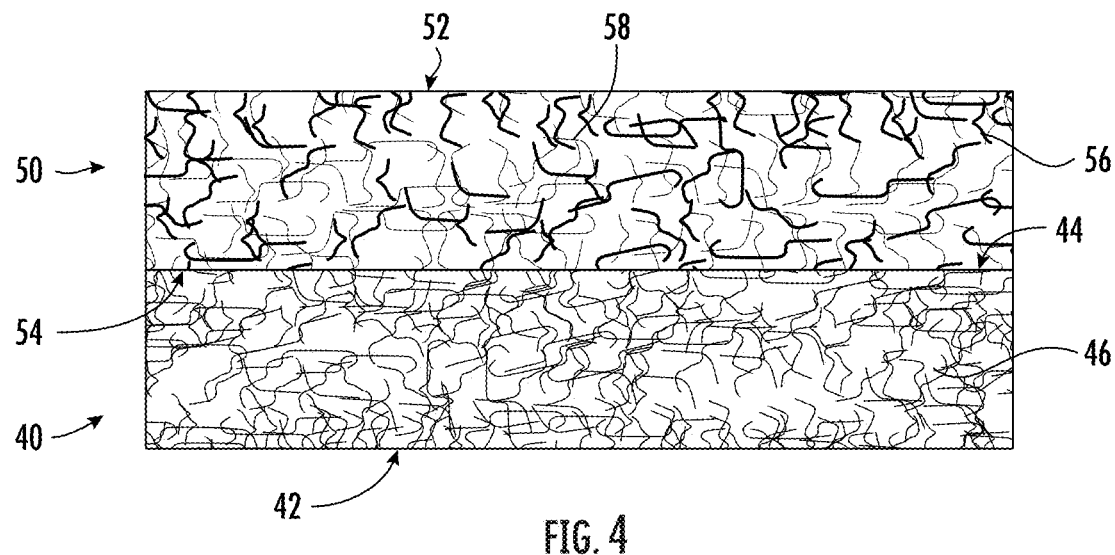
FIG. 4 illustrates a dual-layer filter media.

FIG. 4 illustrates a dual layer filter media that includes a first substrate 40 having a first surface 42 and a second surface 44 opposing the first surface; and a second substrate 50 having a first surface 52 and a second surface 54 opposing the first surface. Second surface 44 of substrate 40 is bonded to second surface 54 of first substrate in any manner known to those skilled in the art. First substrate 40 contains fibers 46 of relatively smaller linear density, e.g., on the order of 3 denier or less. Second substrate 50 contains fibers 56 of relatively larger linear densities, e.g., on the order of 3 denier or greater, such as 5 denier, 6 denier or larger. Second substrate 50 also includes individual nanoparticles 58 dispersed throughout and bonded to fibers 56 and/or retained by second substrate 50. First substrate 40 may, or may not, also include nanoparticles.

First substrate 40 is configured to filter contaminants primarily with fibers 46, although as mentioned previously, first substrate 40 may also include nanoparticles. Second substrate 50 is configured to filter contaminants with both fibers 56 and nanoparticles 58.

In some embodiments, the substrate may compromise additives, such as antibacterial and/or antiviral compositions such as silver, zinc, copper, organosilicone, tributyl tin, organic compounds that contain chlorine, bromine, or fluorine compounds.

The fibers may include biocomponent fibers that include two or more different fibers bonded to each other. The fibers may comprise the same material, or different materials.

FIGS. 5A-5C illustrate different examples of biocomponent fibers that may be used with the fibrous materials disclosed herein. FIG. 5A illustrates a fiber 60 having a core fiber 62 and a surrounding sheath fiber 64. In this embodiment, the core 62 is substantially co-centric with the sheath. FIG. 5B illustrates a biocomponent fiber 70 having first and second fibers 72, 74 that are disposed side-by-side with each other. FIG. 5C illustrates a biocomponent fiber 80 having a core fiber 82 and a sheath fiber 84. In this embodiment, core 82 is eccentric relative to the longitudinal axis of sheath 84, which increases the overall loftiness of the biocomponent fiber. Of course, other configurations are possible. For example, the core may comprise shapes other than circular, such as dog-bone shaped, square, triangular, diamond or the like. Alternatively, the fiber may comprise multiple cores, or it may be split into three, four or more quadrants.

In certain embodiments, the fibrous material (i.e., the fibers and/or the nanoparticles) may be electrostatically charged such that, for example, contaminants are captured both with mechanical and electrostatic filtration. The bond between the fibers and the nanoparticles may also be enhanced by electrostatically charging the nanoparticles, the fibers or both. For example, in certain embodiments, the fibers are electrostatically charged such that mechanical filtration can be achieved by nanoparticles while electrostatic filtration can be achieved through electret substrate. The electrostatic or electret substrate could be high loft triboelectric filter media made by carding and needling. In one of the embodiments, the nanoparticles are preferably deposited into the substrate before needling and then both electrostatic fibers and nanoparticles are needled together.

The substrate, the nanoparticles, or both can be electrostatically charged using triboelectric methods, corona discharge, electrostatic fiber spinning, hydro charging, charging bars or other known methods. Corona charging is suitable for charging monopolymer fiber or fiber blend, or fabrics. Tribocharging may be suitable for charging fibers with dissimilar electronegativity. Electrostatic fiber spinning combines the charging of the polymer and the spinning of the fibers as a one-step process. One suitable method for triboelectric charging is described in U.S. Pat. No. 9,074,301, the entire disclosure of which is hereby incorporated by reference herein for all purposes.

The nanoparticles can be chosen with different triboelectric properties relative to the fibers in order to use a triboelectric effect to enhance particle removal. With this method, the generated nanoparticles are formed in an electrical field and are less subject to contamination by chemicals that may moderate the triboelectric effect. Nanoparticles with different adsorption properties or surface charge characteristics than the coarse fibers can also be used, e.g. in oil or water filtration. This difference can be used to enhance or create localized electrical field gradients within the filter media to enhance particle removal. The nanoparticles and coarse fibers may have different wetting characteristics.

The fibrous material may include a binding agent or binding material, such as an adhesive or binder, to facilitate the bond between the fibers and/or the retention of the nanoparticles in the substrate so that the nanoparticles can adhere to the fibers, or otherwise be retained by the fibers, within the substrate to form a stable matrix. The binding agent or binding material is preferably present in relatively small amounts to bond the individual nanoparticles to fibers throughout the substrate.

The binding agent may comprise variety of conventional materials, including natural-based materials, such as starch, dextrin, guar gum, or the like, or synthetic resins such as EVA, PVA, PVOH, SBR, polyglycolide and the like. In certain embodiments, solvent-based adhesives are used in which bonding occurs upon solvent evaporation.

In one preferred embodiment, the binding agent or binding material comprises a dextrin. In yet another embodiment, the binding agent comprises a composition of various substances, such as water, 2-hexoxyethanol, isopropanolamine, sodium dodecylbenzene sulfonate, lauramine oxide and ammonium hydroxide. In yet another embodiment, the binding agent comprises at least a PVOH. Binding agents could be in solution, emulsion, suspension, hot melt, curable, neat, and/or a combination.

In some embodiments, an adhesive resin is used and the adhesive resin may undergo cross-linking after the coating of the adhesive on the substrate. Adhesion (water/solvent resistance) may be promoted by self-crosslinking as the solvent in the adhesive formulation evaporates or by heat activation during drying process. In the case of certain adhesives, crosslinking can be accomplished through high energy wavelengths of electromagnetic radiation including, but not limited to. RF, UV, or e-beam. The amount of adhesive can be controlled by adjusting the nozzle size of spray coater 140 or controlling the flow rate of the adhesive composition. The binding agent can be applied using spray nozzles, dip coating or other methods.

In some embodiments, the binding agent or binding material may include a surfactant to lower the surface or interfacial tension of the binding agent, thereby increasing its dispersion and wetting properties and allowing the binding agent to more easily penetrate into the depth of the substrate. Suitable surfactants for use with the adhesives disclosed herein include nonionic, anionic, cationic and amphoteric surfactants, such as sodium stearate, 4-(5-dodecyl)benzenesulfonate, sodium dodecylbenzene sulfonate wetting agents, docusate (dioctyl sodium sulfosuccinate), alkyl ether phosphates, benzalkonium chloride (BAC), perfluorooctanesulfonate (PFOS) and the like.

In some embodiments, the substrate includes its own binder composition. In these embodiments, the binding agent or binding material may, or may not, be added to the substrate. In one such embodiment, the substrate comprises biocomponent fibers, wherein one of the components comprises an outer sheath at least partially surrounding an inner core (see FIGS. 5A and 5C).

The sheath may comprise a material that bonds to the nanoparticles. For example, the sheath may comprise a material that becomes tacky and/or fluid upon heating and/or drying. During the heating/drying step (discussed below), the sheath part of the fiber is heated up to its melting point until it becomes tacky and/or fluid to bond the nanoparticles to the substrate. In a preferred embodiment, bonding and drying take place at the same time.

FIG. 23A is a magnified image of a fibrous product having nanoparticles deposited therein without the use of a binder material. FIG. 23B is a magnified image of a fibrous product wherein a binder material of dextrin and water was used to adhere the nanoparticles to the fibers. As shown, the nanoparticles adhere more uniformly to the fibers with the use of a binding agent.

In the examples of FIGS. 23A and 23B, a substrate having bicomponent microfibers with an inner section of polyester and an outer section of high density polyethylene ("HDPE") was used. FIG. 23A shows the microfiber product having the bicomponent microfiber substrate with biosoluble glass nanofiber deposited in a layer on only a surface of the substrate and relying on electrostatic forces to retain the nanofiber. Clumping of the nanofiber and poor retention of the nanofiber can be seen in FIG. 23A. The substrate can be produced using melt blown, spun bond, or other methods described herein.

In the example of FIG. 23B, a binder material was used. The substrate was sprayed with a mixture of dextrin and water and the nanoparticle was applied to the substrate with greater uniformity and greater retention of the nanofibers. In further examples, any of the binder materials disclosed herein can be used. Furthermore, nanoparticles of biosoluble glass have been deposited into the depth of the substrate. In this example, the bicomponent microfiber substrate itself has a MERV rating of 4 to 10, which can be accomplished using any of the methods described herein. With the nanoparticle deposited into the depth of the substrate and having an electrostatic charge, a microfiber substrate originally having a MERV of 8 has been used to produce a fibrous product having a MERV of 13 in one example. In another example, a microfiber substrate originally having a MERV of 6 has been used to produce a fibrous product having a MERV of 15. The substrate is provided on a roll and, in a roll to roll continuous process, such as any of the processes and methods described herein, the fibrous product can be produced on a commercial scale. In an example, a roll to roll process operated at 30 feet per minute.

In certain embodiments, the fibrous materials discussed herein may be included as part of a filter device that traps or absorbs contaminants, such as a liquid filter, a gas filter for home and commercial air filtration, a surgical mask or other face covering or the like. The filter device may be a mechanical filter, absorption filter, sequestration filter, ion exchange filter, reverse osmosis filter, surface filter, depth filter or the like, and may be designed to remove many different types of contaminants from air, water, or others.

In one such embodiment, the fibrous materials are incorporated into an air filter that removes particles and contaminants from the air, such as a HEPA filter (i.e., pleated mechanical air filter), a UV light filter, an electrostatic filter, a washable filter, a media filter, a spun glass filter, pleated or unpleated air filters, active carbon filters, pocket filters, V-bank compact filters, filter sheets, flat cell filters, filter cartridges and the like. The fibrous materials may comprise a filter media for the air filter and may be supported by a support layer, a scrim layer, or may be included in other layers or materials. Applicant has discovered that incorporating nanoparticles in depth into fibrous materials as discussed herein substantially increases the efficiency of the air filter without compromising other factors, such as pressure drop (i.e., air flow) through the filter. In addition, these materials increase the overall dust holding capacity and thus the life of the filter, particularly compared to filters that rely solely or primarily on electrostatic effects to increase efficiency.

Conventional home and commercial air filters, such as HEPA filters, are typically rated by the filter's ability to capture particles between about 0.3 and 10 microns. This rating, referred to as a Minimum Efficiency Reporting Value or MERV is developed by the American Society of Heating, Refrigerating and Air Conditioning Engineers (ASHRAE). The MERV ratings range from 1-16, with higher values indicating higher efficiencies at trapping specific types of particles. Conventional mechanical air filters typically report MERV ratings for fibrous filtration materials of about 8.

Air filters are typically rated based on their initial efficiency (i.e., the efficiency of the air filter prior to use) and their efficiency over time and use. This latter efficiency is typically tested through a conditioning step, referred to as ASHRAE Standard 52.2 Appendix J.

The air filters provided herein have an initial MERV rating greater than about 10 and a pressure drop less than about 0.5 inches of water. In some cases, the initial MERV rating is about 11 and the pressure drop is equal to or less than about 0.17 inches of water, or about 13 and the pressure drop is equal to or less than about 0.36 inches of water, or about 14 and the pressure drop is equal to or less than about 0.5 inches of water.

The gas filters provided herein have a MERV rating of 10 or greater after the gas filter has been conditioned with ASHRAE Standard 52.2 Appendix J. In some embodiments, the MERV rating is 13 or greater after the gas filter has been conditioned with ASHRAE Standard 52.2, ISO Standard 16890 or any other acceptable standard in the industry.

The MERV rating of the fibrous filter media discussed herein will vary based on many factors, including the types and sizes of fibers used in the filter media, the density of individual nanoparticles within the filter media, the width of the filter media, the number and size of pleats (if any) and the like. The MERV rating can be measured for a sheet of the fibrous product, as well as the fibrous product formed as a pleated filter media, and the pressure drop for each can vary. Likewise, the pressure drop across the filter media will also depend on many factors, including those mentioned above.

One factor that impacts both MERV rating and pressure drop is the density or add-on amount of the nanoparticles within the substrate relative to the density of the fibers within the substrate. Applicant has discovered that the lower the ratio between substrate density and nanoparticle density, the higher the MERV rating of the filter and the higher the pressure drop. In certain embodiments, the filter media described herein have a nanoparticle area density of about 0.1 grams/m$^2$ to about 20 grams/m$^2$, preferably at least about 2 grams/m$^2$.

In some situations, the density of the nanoparticles will also depend on the density of the actual filter media (i.e. the density of the coarse fibers). As discussed in more detail below in reference to Table 2 below, a density ratio of about 67 (substrate gsm divided by add-on nanoparticles gsm) resulted in a pressure drop of about 0.14 inches of water and an initial MERV rating of 10. A density ratio of about 33.4 increased the MERV rating to 10 while only resulting in an increase in pressure drop to about 0.17. A density ratio of about 22.3 increased the initial MERV rating to about 12 with a pressure drop of about 0.24 inches of water.

Thus, the efficiency or MERV rating of the filter may increase with higher add-on amounts of nanoparticles. In particular, Applicant has discovered that, for example, with add-on amounts of at least 2 g/m$^2$, a filter having a MERV rating of about 10 may be achieved. Add-on amounts of 4 or 6 g/m$^2$ provide a filter with a MERV rating of about 12 and 13, respectively. Add-on amounts of 10 g/m$^2$ or higher result in a filter with a MERV rating of 15 or higher.

Applicant has also discovered that including fibers with greater thicknesses or linear densities result in larger pore size and thus more pore volume, thereby allowing for a higher density of nanoparticles within the substrate. This results in a higher MERV rating and pressure drop (as discussed below in reference to Table 2). For example, Applicant has been able to produce an air filter with a MERV rating of 14 and a pressure drop of 0.5 inches of water with 5 denier biocomponent fibers. Similarly, Applicant was able to produce a filter with a MERV rating of 13 and a pressure drop of only about 0.29 inches of water with 5 denier biocomponent fibers.

Figure 6:
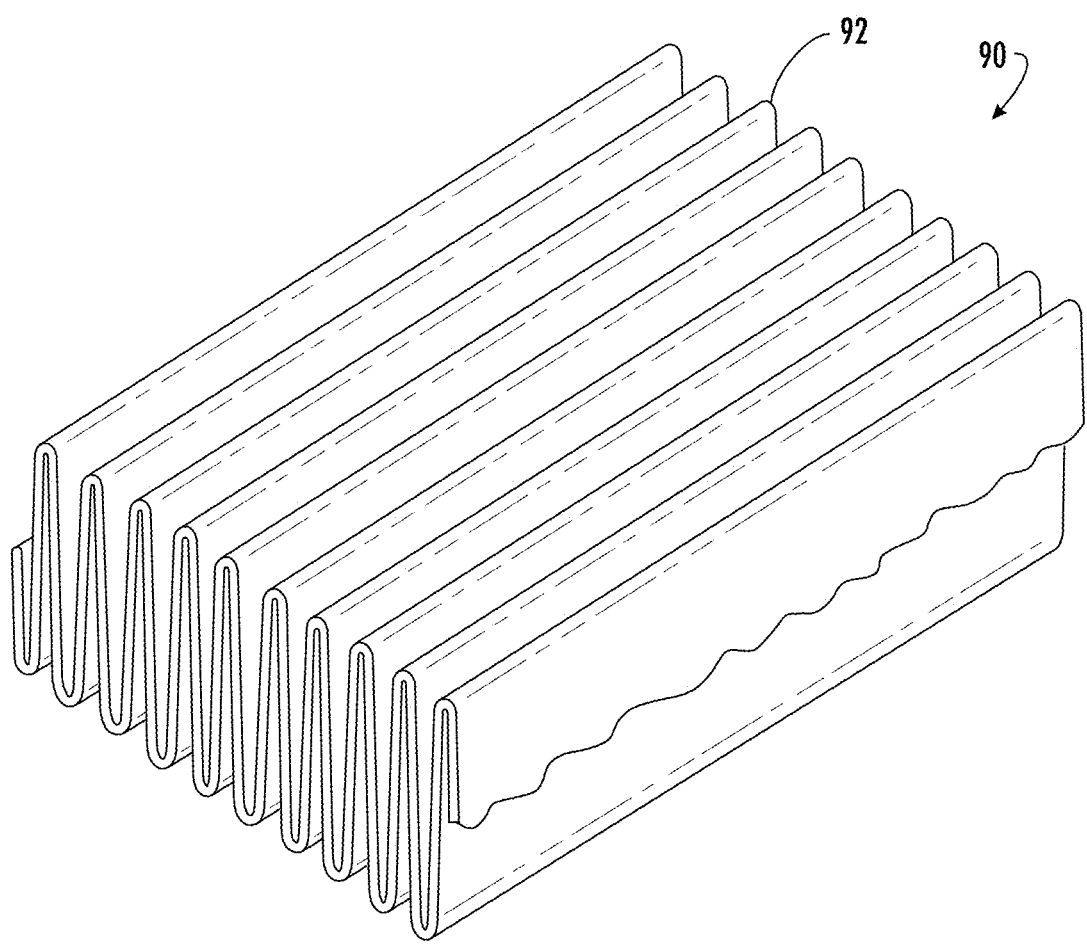
FIG. 6 illustrates a pleated fibrous filter media.
Figure 7:
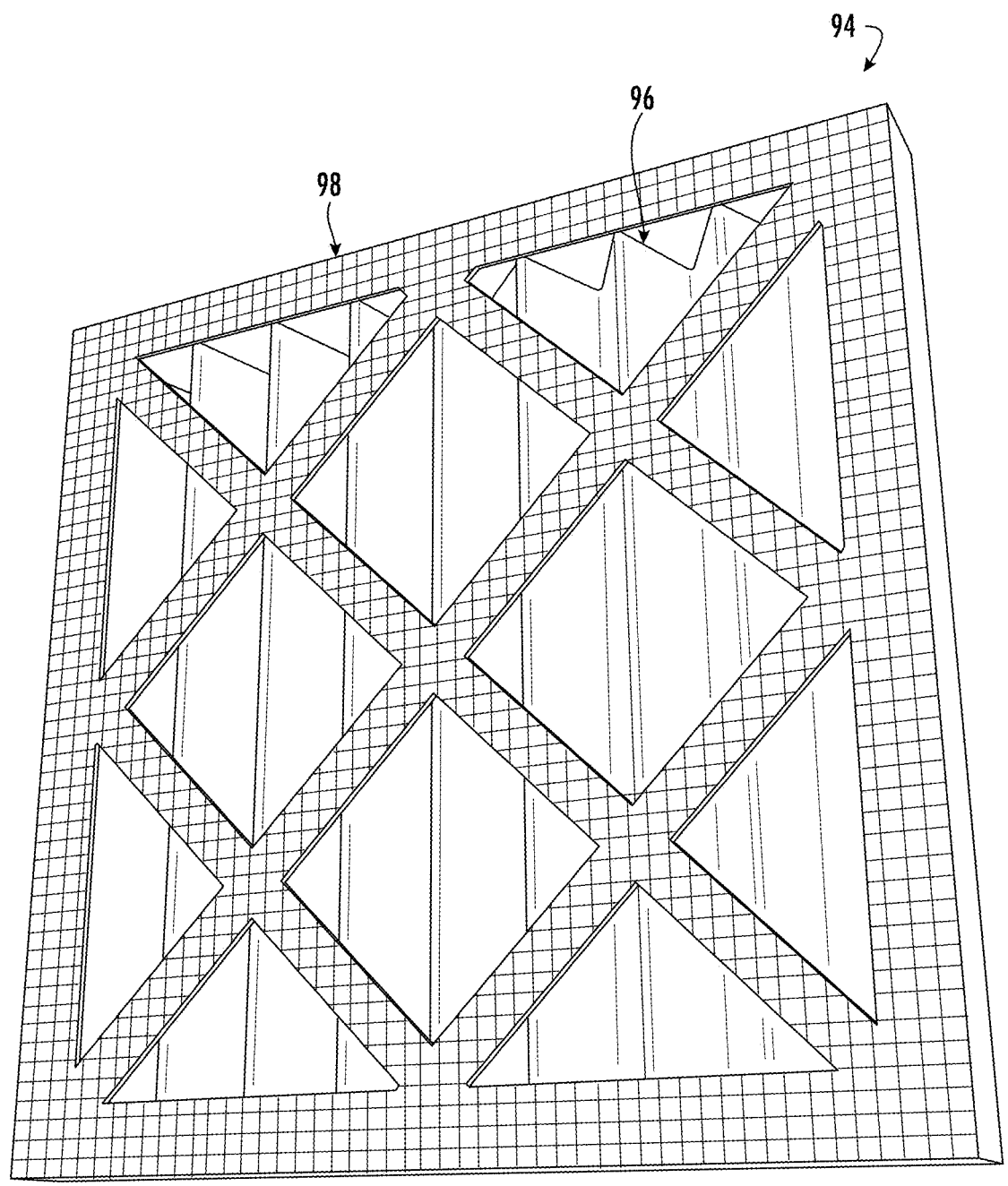
FIG. 7 illustrates a representative air filter.

An example of a pleated filter medium 90 is shown in FIG. 6. Filter 90 may include about 0 to 10 pleats/inch, depending on the application. The filter medium can be mounted in a cardboard or metal frame and used as an easily replaceable filter product. (FIG. 7). As shown, a gas filter 94 produced with the fibrous material described herein. As shown, filter 94 comprises a pleated fibrous filter media 96 and a support layer 98 that provides rigidity and structure to filter media 96.

Figure 11:
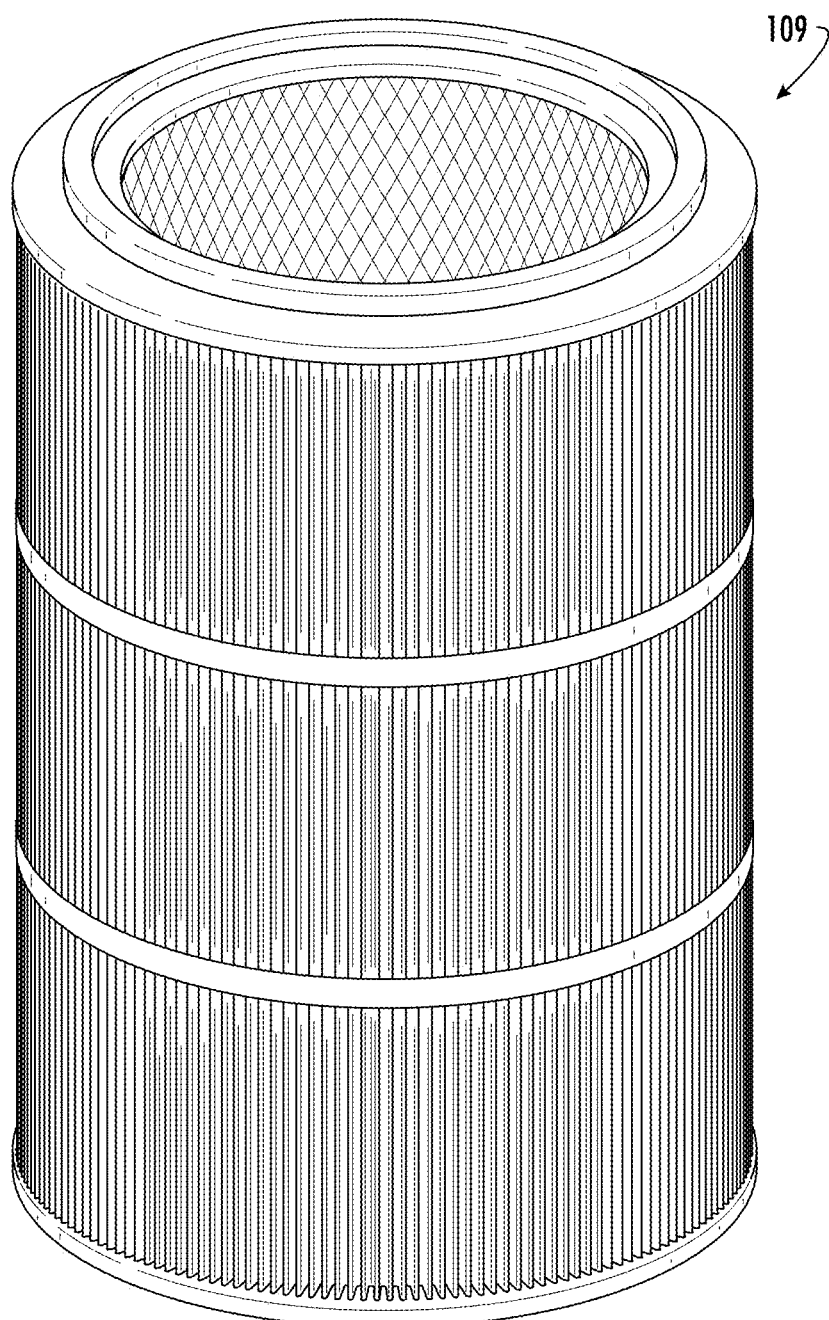
FIG. 11 illustrates a substantially cylindrical gas filter.

FIG. 11 illustrates a gas filter 109 produced with the fibrous material described herein. Gas filter 109 includes a fibrous substrate having fibers and nanoparticles dispersed through the depth of the substrate. The substrate is then rolled into a cylinder, cone or other suitable shape and may be used in applications, such as gas turbine and compressor air intake filters, panel filters and the like.

Other types of filters that may be developed with the fibrous material disclosed herein include conical filter cartridges, square end cap filter cartridges, pocket filters, V-bank compact filters, panel filters, flat cell filters, pleated or unpleated bag cartridge filters and the like.

The fibrous products disclosed herein may be used in medical masks or other medical applications, such as cartridges in respirators. Medical masks are designed to protect healthcare personnel and/or patients from microbials and other materials. For example, medical masks can block bacteria, which can have a dimension of about 3 microns, for example, as well as viruses, which can have a dimension of about 0.1 microns, for example. The masks are made using fibrous materials in multiple layers, and have ear loops, ties, or other structures for attaching the mask to a person's face. A wire may be incorporated into at least an upper portion of the mask so that at least that portion conforms to the person's face. The mask can include rigid polymeric structures designed to hold the multilayer fibrous materials in front of a person's face. In one example, the mask has three layers. The outer layer and inner layer comprise a fibrous material such as spunbond polypropylene that provides breathability, although any of the materials mentioned herein can be used. The middle layer is disposed between the inner layer and outer layer and comprises a microfiber substrate having nanoparticles deposited into the depth of the substrate to provide an initial MERV of greater than 8, preferably a MERV greater than 10, and more preferably a MERV of 13 or more. The pressure drop through the mask is 3 to 6 mm of water, more preferably 4 mm of water for breathability. It is desirable for the mask to have an efficiency of about 95%. Other examples of masks have four or more layers. Multiple layers of the fibrous products can be combined in a single mask.

In certain embodiments, the fibrous material may be included in a thin film or layer that includes apertures, pores or perforations. The apertures may be embossed in a pattern (such as circular, diamond shaped, hexagonal, oblong, triangular, rectangular, etc.) and then stretched until apertures form in the thinned out areas created by the embossing. Such an apertured substrate can be formed from many polymers, such as polypropylene, polyethylene, high density polyethylene ("HDPE") and the like. The polymer layer may, for example, comprise an extruded film. An apertured film is available commercially and is marketed under the trademark Delnet®. The substrate is provided in a roll and nanofibers are deposited into the substrate in a roll to roll process. FIGS. 10A-10E illustrate examples of apertured films that may be formed with the methods described herein.

In other embodiments, a gas filter comprises a filter media and a substantially rigid support layer bonded to the filter media. The support layer includes fibers and individual nanoparticles dispersed in depth within the layer. The nanoparticles are configured to filter contaminants passing through the support layer.

Figure 8:
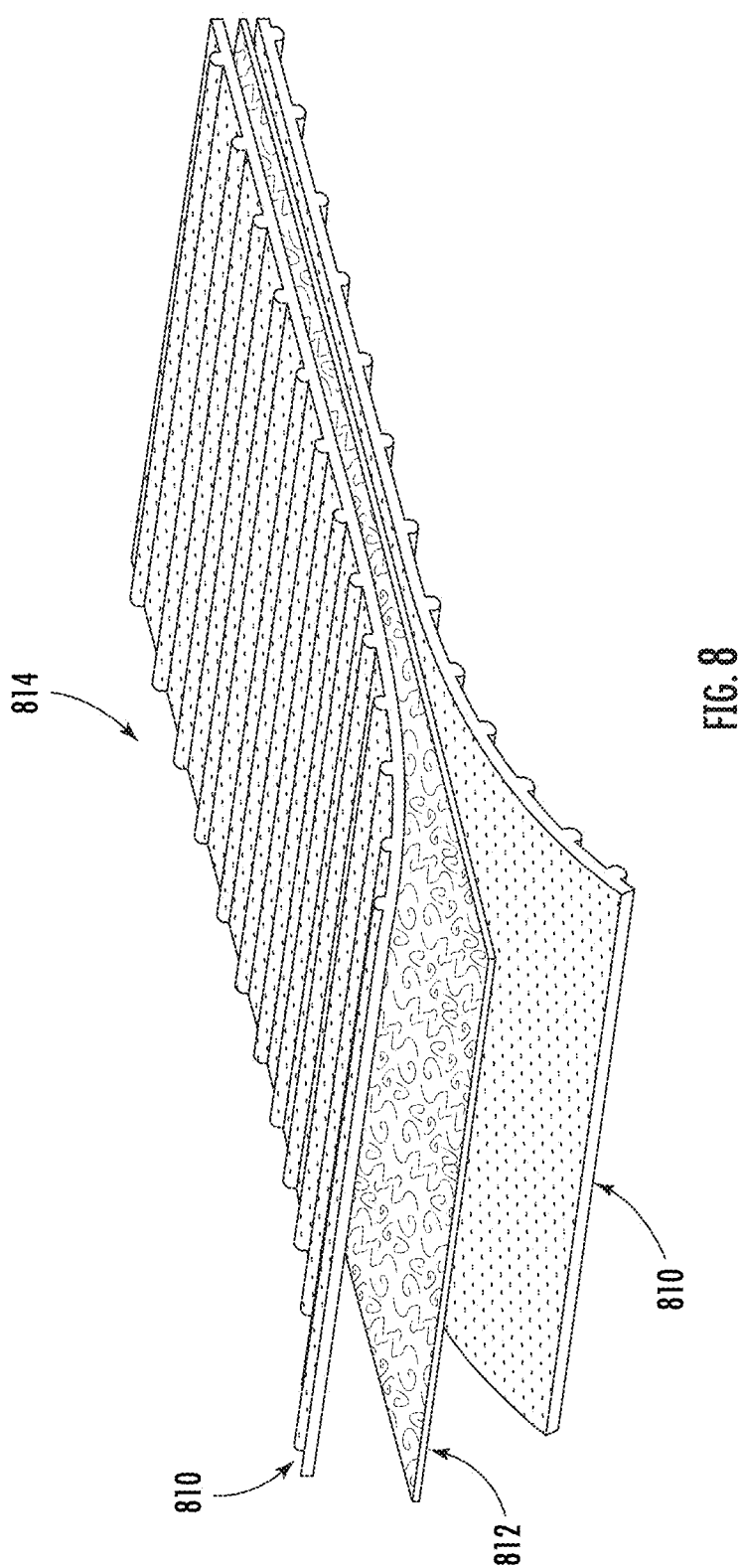
FIG. 8 illustrates a gas filter with first and second support membranes and a filter media.

Referring to FIG. 8, a composite filter member 814 includes an internal filter substrate 812 and one or more filter support members or membranes 810. Support members 810 may be formed from an extruded sheet of a polymer, such as a polypropylene film, a high density polyethylene film a polylactic acid film or a thermoplastic polymeric material such as an extrudable fluoroplastic material, in embodiments a perfluoroalkoxy alkane (PFA) copolymer made from co-monomers polytetrafluoroethylene and perfluoroalkyl vinyl ether. However, other polymeric materials such as fluoroplastics may be used e.g., ethylenechlorotrifluorethyle (ECTFE); ethylenetetrafluroethylene (ETFE) of polyvinylidene fluoride (PVDF).

In certain embodiments, support membranes 810 comprise individual nanoparticles dispersed in depth within the membrane 810, as discussed above. The nanoparticles allow the support membrane to filter at least some of the contaminants passing through filter membrane 814, i.e., in addition to the filtering provided by internal filter substrate 812. In other embodiments, the filter substrate 812 and/or the support membranes 810 include such nanoparticles.

Fluoroplastic material such as PFA is highly desirable for use in filters intended to clean semiconductor components and in other environments where extreme cleanliness is required and the possibility of contamination is minimized. Such support membranes are designed to both direct fluids to be filtered along their surfaces and also for directing the fluids through the structure into the underlying filter substrate to remove undesired particulates from the filtrate.

Figure 9A:
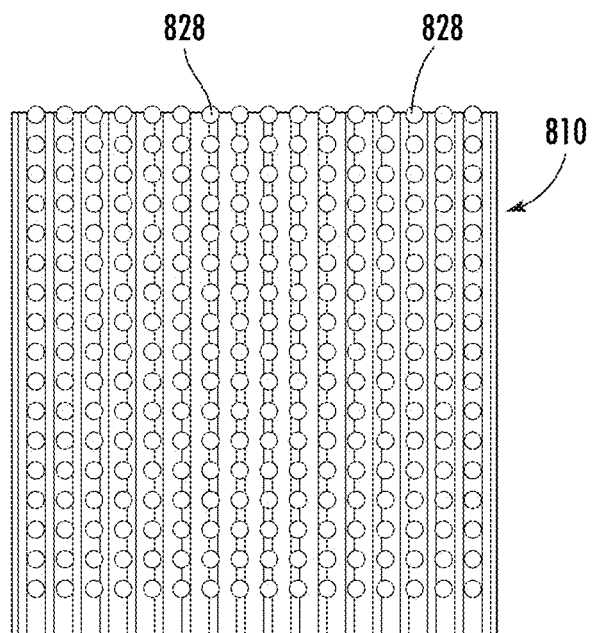
FIGS. 9A and 9B illustrate apertured films for use as support membranes.
Figure 9B:
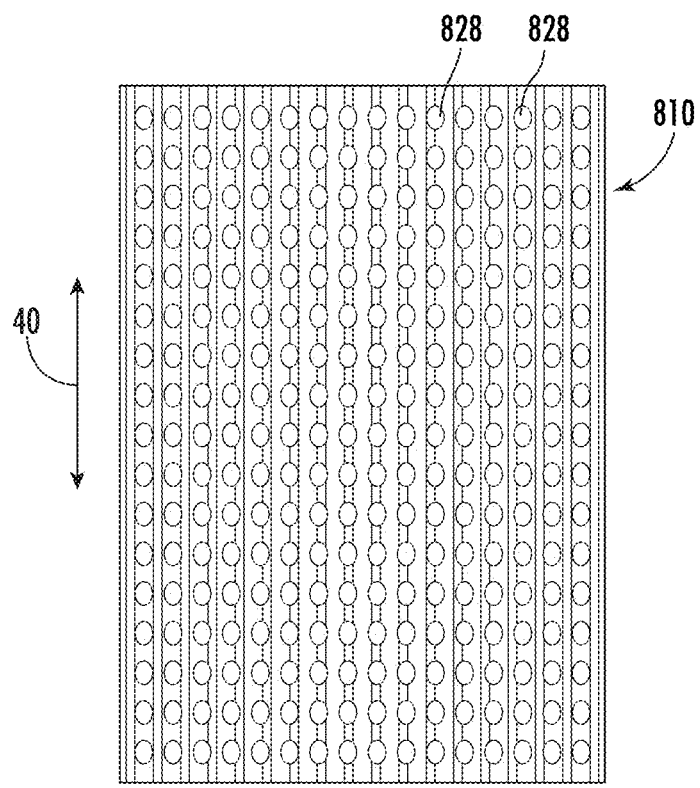
Figure 10A:
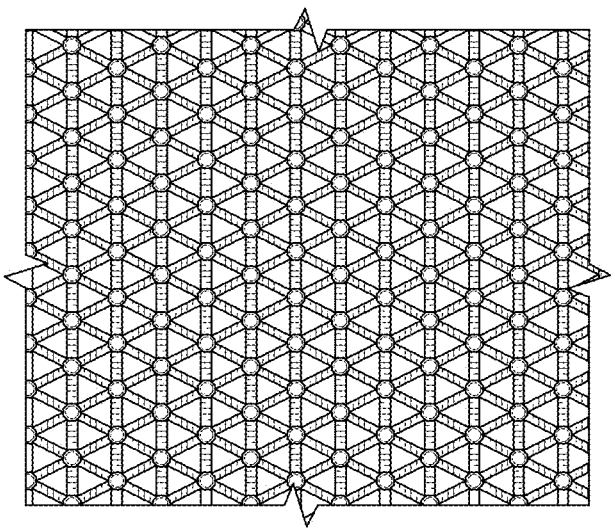
FIGS. 10A-10E illustrate different embodiments of apertured films with nanoparticles incorporated into the films.
Figure 10B:
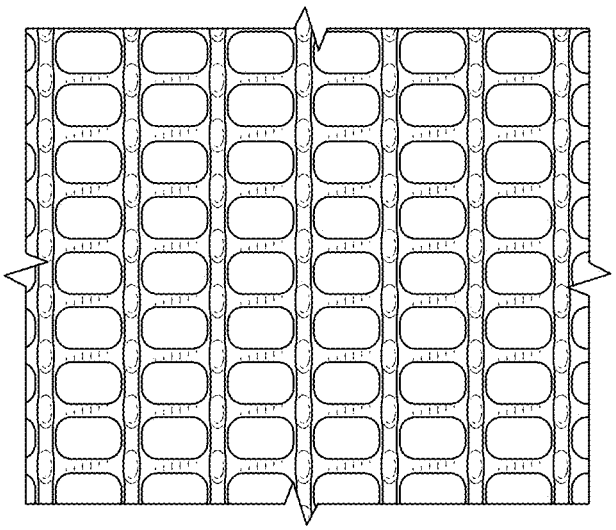
Figure 10C:
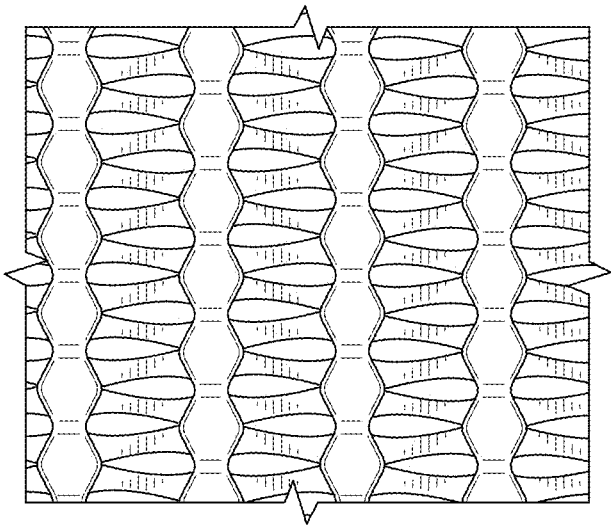
Figure 10D:
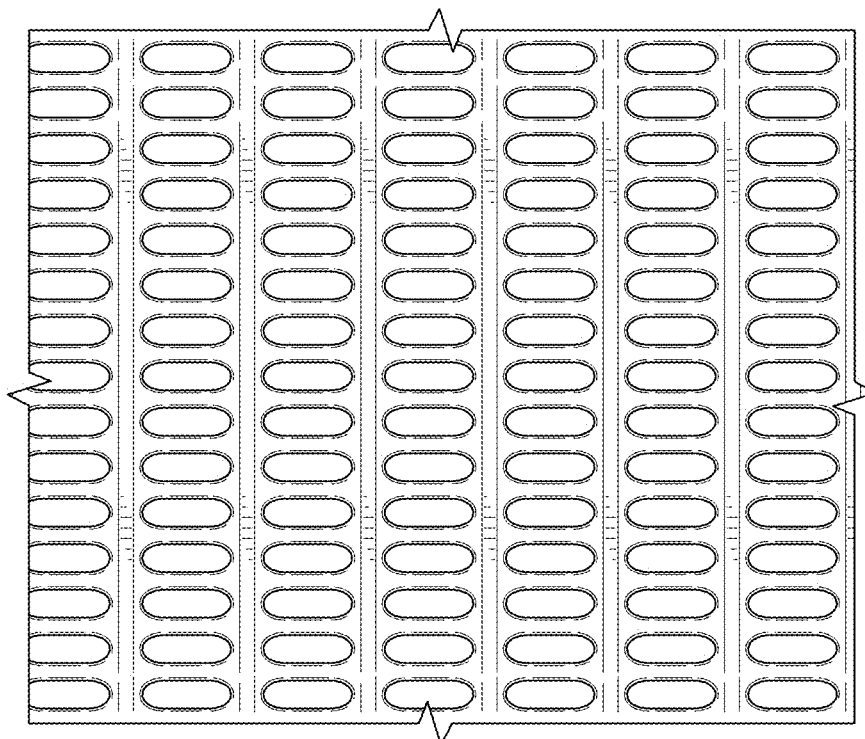
Figure 10E:
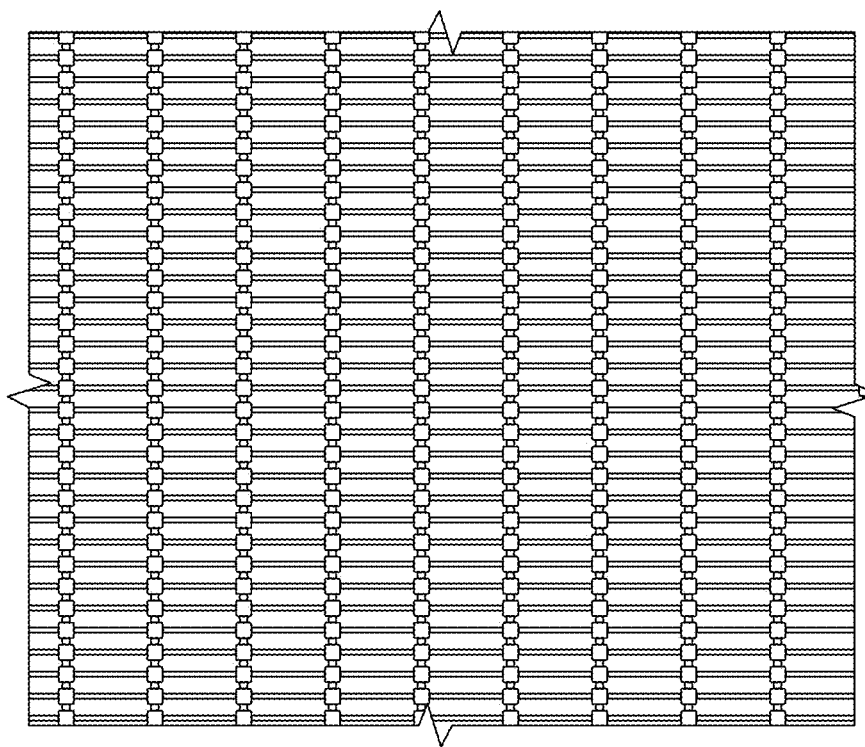

As shown in FIGS. 9A and 9B, support membranes 810 may include a plurality of apertures 828. Apertures are preferably round in shape although it will be recognized that other shapes are possible, such as square, rectangular, triangular and the like. The substrate may be wound into a roll and subsequently unwound and directed through a punch press to form apertures 828 through the Z-direction in a desired, predetermined pattern (FIG. 9A). Alternatively, the sheet, after being set, can be directed in a continuous operation through a punch press to form the predetermined pattern of apertures 828 therein.

Referring to FIG. 9B, after aperturing, the filter support members can be stretched in the machine direction, as indicated by the double-headed arrow 940, to elongate the apertures 828 for providing greater open area for passage of the fluid to be filtered by the filter media or substrate 812.

In an alternative embodiment, the support membrane 810 may be porous (i.e., rather than, or in addition to, having apertures 828). In this embodiment, the additional fluid flow can be accomplished with a substantially porous support membrane. In an exemplary embodiment, the support membrane has a porosity value of at least 0.5 or 50%, preferably at least 0.8 or 80% and more preferably about 0.86 or 86%. Porosity value is defined as the nonsolid or pore-volume fraction of the total volume of the material. A more complete description of such a composite filter medium can be found in PCT Application Serial No. US2020/040941, the complete disclosure of which is incorporated herein by reference in its entirety for all purposes.

The present support membranes for filters may be prepared by any methods known by those of ordinary skill in the art. In one example shown in FIGS. 9A and 9B, the support membranes include ribs. For example, support membranes may be made by extruding a polymer material to form of a sheet and then passing the sheet through a nip region provided by opposed rollers; at least one of the rollers having an outer surface with counter-sunk grooves. Counter-sunk grooves in one roller are aligned with an outer surface or counter-sunk grooves of the other roller in the nip region to form a ribbed sheet having ribs upstanding from at least one surface of the sheet. Alternatively, ribs may be formed during the extrusion process or known methods of embossing. Once the ribs are formed the support membrane may be wound into a roll and subsequently unwound and directed through a press to form apertures through the Z-direction thereof in a desired, predetermined pattern. Alternatively, after being set, the support membrane can be directed in a continuous operation through a punch press to form the predetermined pattern of apertures therein, as best seen in FIG. 9A. Optionally, the support membrane can be stretched in the machine direction (indicated by the double-headed arrow in FIG. 9B) to elongate the apertures for providing greater open area for passage of fluid to be filtered by, for example, a filter layer or substrate.

Figure 12:
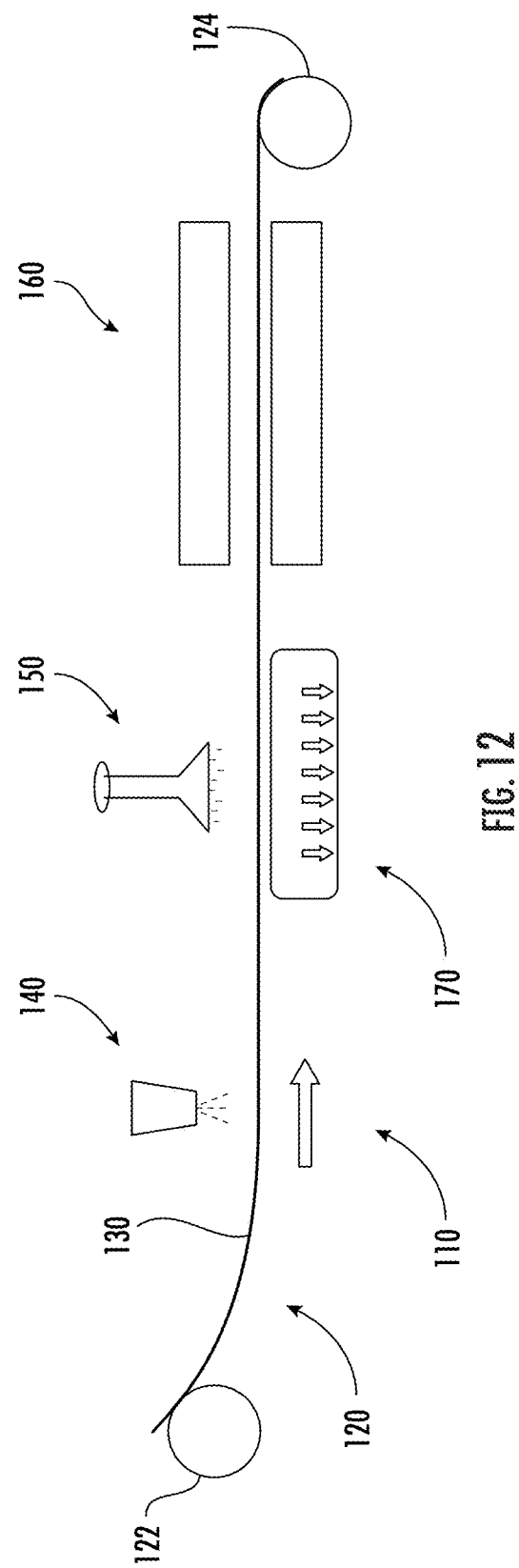
FIG. 12 schematically illustrates a system for manufacturing fibrous material within a substrate.

FIG. 12 schematically depicts an overall system 110 for manufacturing the fibrous materials and other products described above. As shown, system 110 comprises a feeder 120 for advancing a substrate 130 of fibers or other material through the manufacturing process. System 100 further includes a coater 140, a fiberization system 150 and a heating and/or drying device 160. In certain embodiments, system 100 further includes a vacuum or other source of negative pressure 170 underlying substrate 130 opposite fiberization system 150.

In one embodiment, feeder 120 comprises a winder 122 on the downstream end of the process and an unwinder 124 on the upstream end that continuously winds substrate 130 through system 100. In certain embodiments, feeder 120 may further comprise a support surface (not shown) extending between the winders for supporting substrate 130 as it moves downstream through system 100. In other embodiments, substrate unwinds directly from unwinder 124 to winder 122 without another support surface.

Coater 140 is configured to spray droplets of a binding agent or binding material, such as an adhesive or binder, onto substrate 130 so that the nanoparticles can adhere to fibers within substrate 130 to form a stable matrix. The binding agent is preferably present in relatively small amounts to bond the individual nanoparticles to fibers throughout substrate 130. In a preferred embodiment, coater 140 comprises a spray nozzle sized to generate adhesive droplets having a diameter of about 20 to 30 microns to increase the penetration depth of the adhesive through substrate 130. Of course, the droplet size may be affected by numerous other parameters, including air pressure, volume of air, temperature of air, humidity, spray horn design, rheology/viscosity of the adhesive, the carrier and the like.

Of course, it will be recognized that coating the substrate with a binding agent or binding material may be achieved with other coating methods, which include ultrasonic spraying, dip coating, spin coating, gravure coating, kiss roll coating, screen coating, powder coating, electrostatic, sputter coating, or similar coating techniques.

As discussed above, the binding agent may comprise variety of conventional materials, including natural-based materials, such as starch, dextrin, guar gum, or the like, or synthetic resins such as EVA, PVA, PVOH, SBR and the like. In certain embodiments, solvent-based adhesives are used in which bonding occurs upon solvent evaporation.

In one preferred embodiment, the binding agent comprises a dextrin. In another embodiment, the binding agent comprises a composition of various substances, such as water, 2-hexoxyethanol, isopropanol amine, sodium dodecylbenzene sulfonate, lauramine oxide and ammonium hydroxide. In yet another embodiment, the binding agent comprises PVOH. Binding agents could be in solution, emulsion, suspension, hot melt, curable, neat, and/or a combination.

In some embodiments, an adhesive resin is used and the adhesive resin may undergo cross-linking after the coating of the adhesive on substrate 130. Adhesion (water/solvent resistance) may be promoted by self-crosslinking as the solvent in the adhesive formulation evaporates or by heat activation during drying process. In the case of certain adhesives, crosslinking can be accomplished through high energy wavelengths of electromagnetic radiation including, but not limited to. RF, UV, or e-beam. The amount of adhesive can be controlled by adjusting the nozzle size of spray coater 140 or controlling the flow rate of the adhesive composition.

In some embodiments, the binding agent may include a surfactant to lower the surface or interfacial tension of the binding agent, thereby increasing its dispersion and wetting properties and allowing the binding agent to more easily penetrate into the depth of the substrate. Suitable surfactants for use with the binding agents disclosed herein include nonionic, anionic, cationic and amphoteric surfactants, such as sodium stearate, 4-(5-dodecyl)benzenesulfonate, sodium dodecylbenzene sulfonate wetting agents, docusate (dioctyl sodium sulfosuccinate), alkyl ether phosphates, benzalkonium chloride (BAC), perfluorooctanesulfonate (PFOS) and the like.

In some embodiments, spray coater 140 is located upstream of fiberization system 150 so that the binding agent is sprayed before the nanoparticles are deposited. In other embodiments, spray coater 140 is located downstream of fiberization system 150 so that the binding agent can be sprayed after nanoparticle deposition. In other embodiments, systems 100 includes two spray coatings; one located upstream from fiberization system 150 and a second spray coater (not shown) located downstream of fiberization system 150 to coat substrate 130 with a secondary binding agent after deposition of the nanoparticles.

In some embodiments, there is more than one nozzle head with each spray coater 140. The nozzle heads may, for example, be disposed in series for better uniformity or to increase fiber spraying width. Alternatively, the nozzle heads may be located in parallel, i.e., across the width of the substrate, to ensure that the binding agent is coated throughout the width of the substrate.

In a preferred embodiment, a source of negative pressure or a vacuum (not shown) is disposed under 130 substrate opposite spray coater 140 to increase the penetration depth and uniformity of the binding agent. The source of negative pressure may be any suitable suction device that draws binding agents through substrate, such as a suction pump or the like.

In some embodiments, the substrate includes its own binder composition. In these embodiments, the binding agent may, or may not, be added to the substrate. In one such embodiment, the substrate comprises biocomponent fibers 600, wherein one of the components comprises an outer sheath 64 at least partially surrounding an inner core 62. In certain embodiments, sheath 64 and core 62 may be substantially co-centric with each other (FIG. 5A). In other embodiments, the core 84 may be eccentric with the sheath 82 (FIG. 5C). In other embodiments, the core 72 and sheath 74 may lie side-by-side with each other (FIG. 5B). Of course, other configurations are possible. For example, the core 184 may comprise shapes other than circular, such as dog-bone shaped, square, triangular, diamond or the like. Alternatively, the fiber 180 may comprise multiple cores, or it may be split into three, four or more quadrants.

The sheath 64 may comprise a material that bonds to the nanoparticles. For example, the sheath 64 may comprise a material that becomes tacky and/or fluid upon heating and/or drying. During the heating/drying step, the sheath 64 part of the fiber is heated up to its melting point until it becomes tacky and/or fluid to bond the nanoparticles to the substrate. In a preferred embodiment, bonding and drying take place at the same time within drying device 160.

Figure 13:
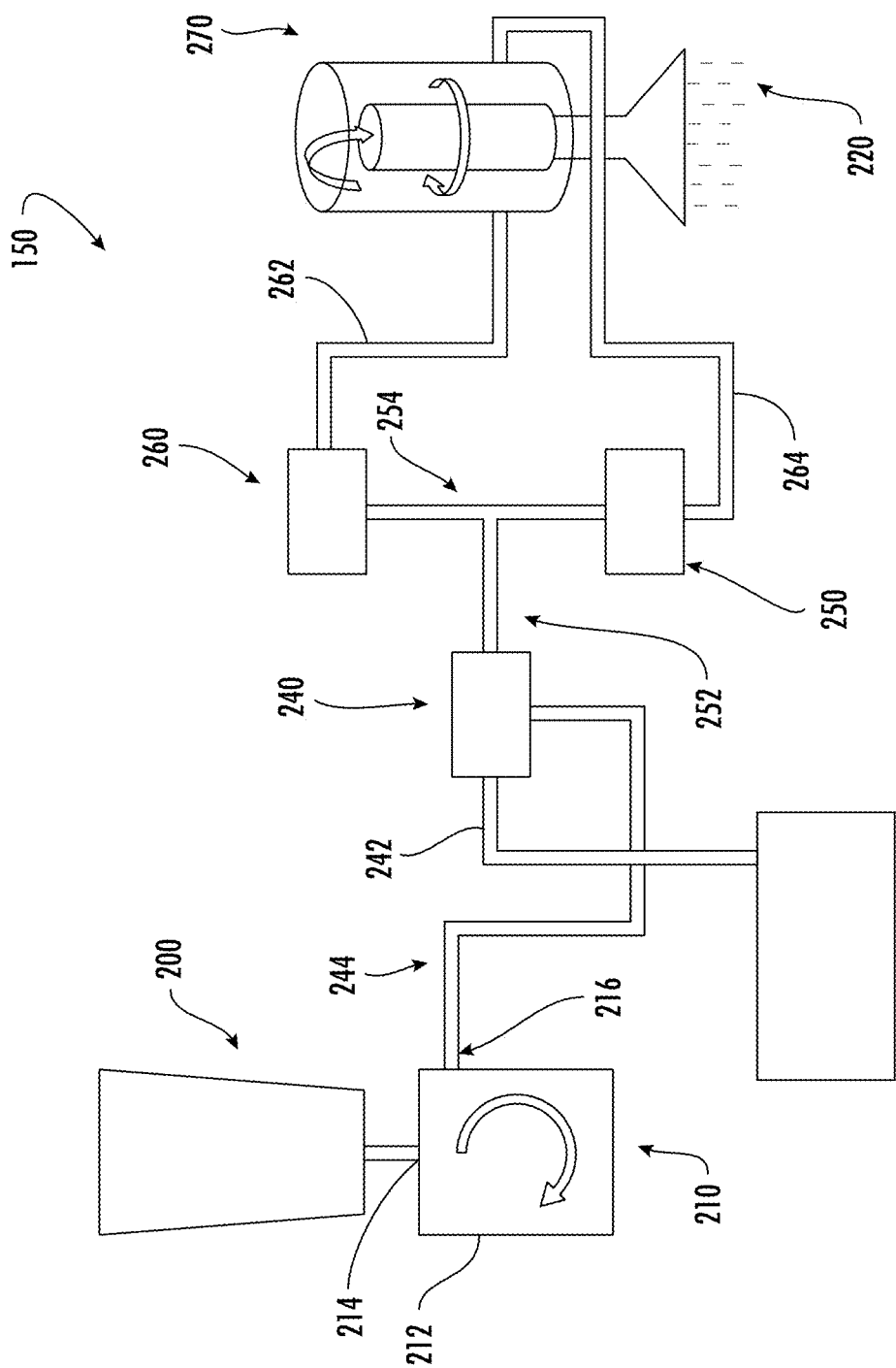
FIG. 13 schematically illustrates a system for converting groups of nanofibers into individual nanoparticles.
Figure 14A:
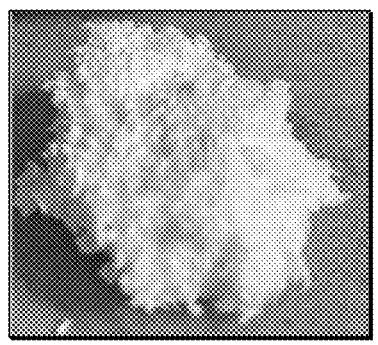
FIGS. 14A-14C are photographs of macro clusters of nanofibers, smaller clusters of nanofibers and individualized nanoparticles, respectively.
Figure 14B:
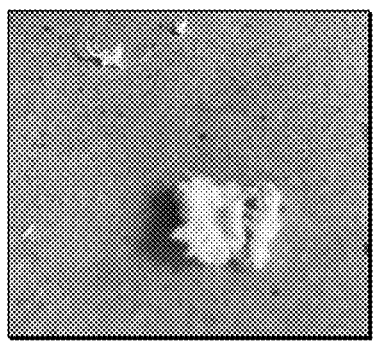
Figure 14C:
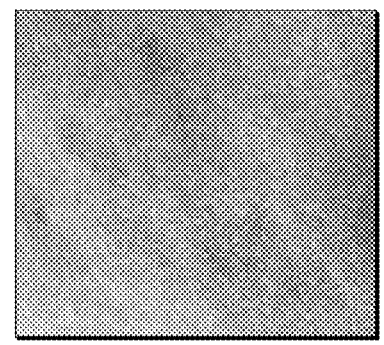
Figure 15:
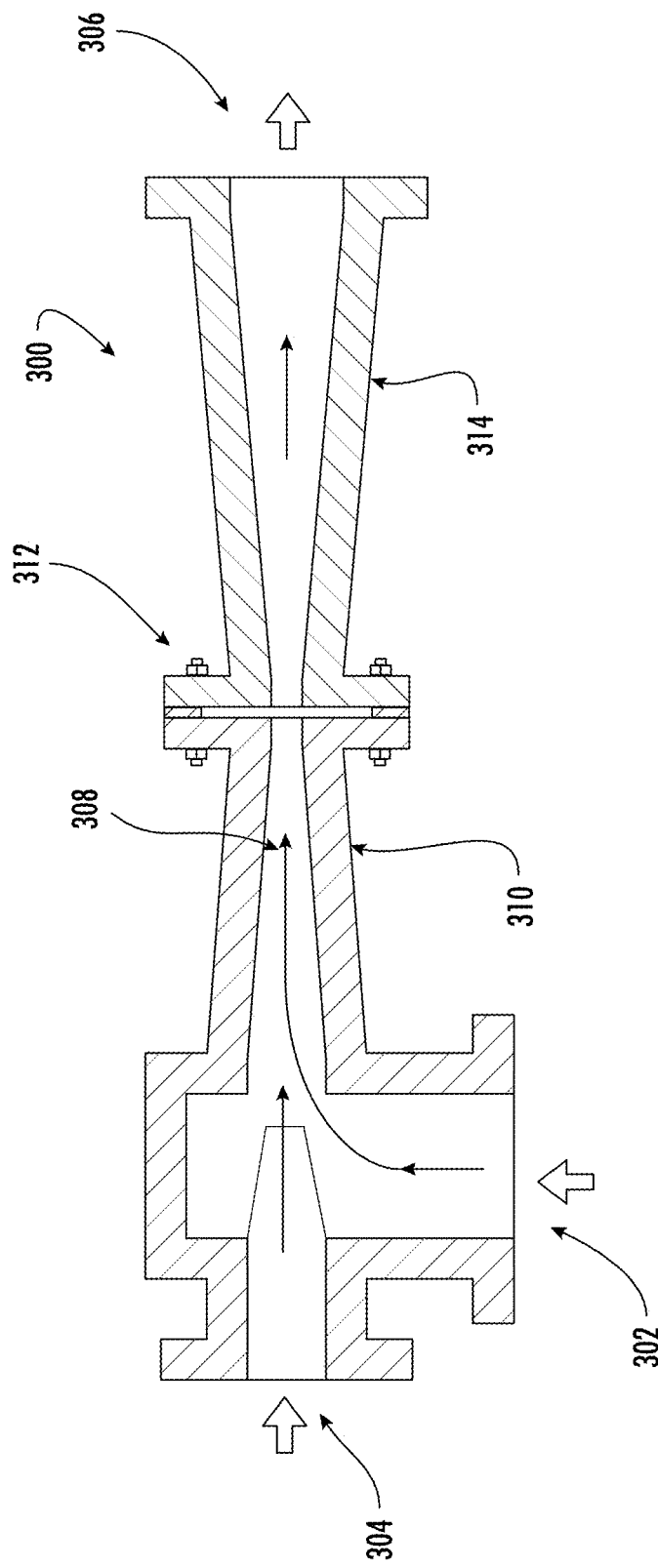
FIG. 15 illustrates an eductor of the system of FIG. 13.
Figure 16:
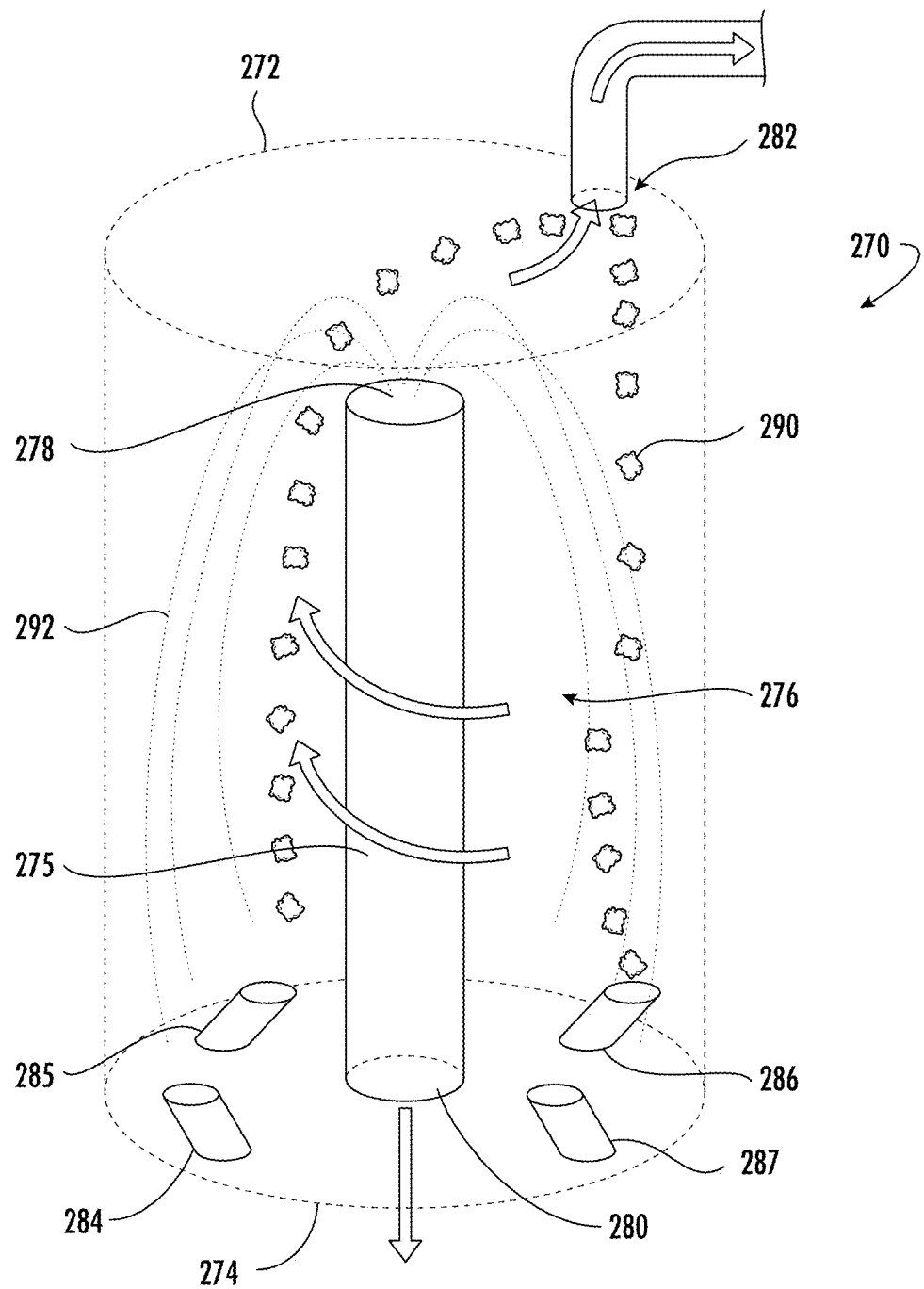
FIG. 16 illustrates a reactor of the system of FIG. 13.

FIG. 13 schematically depicts a fiberization system 150 for converting groups of nanofibers into individual nanoparticles. The term "fiberization" as used herein means converting (e.g., opening up, separating, isolating and/or individualizing) clusters, clumps or other groups of nanoparticles that may, or may not, be entangled with each other into individual nanoparticles having at least one dimension less than 1 micron. FIGS. 14A-14C illustrate examples of macro clusters of entangled nanofibers (FIG. 14A), smaller clusters of entangled nanofibers (FIG. 14B) and individual nanoparticles (FIG. 14C).

As shown, fiberization system 150 includes a feeder 200, such a hopper, for introducing the larger or macro clusters/clumps of nanoparticles (see FIG. 14A) into system 150. Feeder 200 may comprise any suitable hopper device known by those skilled in the art and preferably is configured to introduce macro clusters of particles into the process at a specified rate, which will depend on the rate of fiberization downstream. The nanoparticles may be introduced continuously at a specified rate, or an intervals at a specific rate. The macro clusters of nanoparticles in bundles may be broken apart prior to introducing them into feeder 200.

It should be recognized that the nanoparticles may be introduced into fiberization device 150 in many different forms. For example, raw nanofibers may be produced as long separated fibers. In this form, the nanofibers may be cut to obtain the desired length to diameter ratio.

System 150 further includes a separator 210, such as a blender or the like, for separating or breaking down the macro clusters/clumps of nanoparticles into smaller clusters/clumps of nanoparticles (see FIG. 14B). Feeder 200 transfers nanofibers into separator 210 by any mechanical means in a steady continuous state. The speed of transfer will depend on a variety of factors, such as the velocity of substrate 130 along feeder 120, the rate of fiberization of the nanoparticles and the like. With the help of controlling the amount of nanoparticles dropping into separator 210, the amount of nanoparticles dispersed into the substrate can be controlled to create a continuous manufacturing process.

In one embodiment, separator 210 includes a housing 212 with a first opening 214 coupled to feeder 200 and a second opening 216 coupled to the downstream process. The second opening 216 is preferably sized to only allow clusters of nanofibers having a certain size to pass therethrough. Separator 210 may include a plurality of rotatable blades (not shown) designed to rotate around a vertical axis within housing 212 to separate and open the coarse clusters of nanofibers. The blades may have the same, or different, pitches and cambers to allow for sequential breaking down or "opening" of the entangled fibers as they pass from first opening 214 to second opening 216.

Fiberization system 150 further includes a stream of gas that extends throughout the system from separator 210 to a nozzle 220 (discussed in more detail below). The stream of gas (along with a series of pumps as discussed below) provides the motive force to move the nanofibers through system 150. In one embodiment, the stream of gas is created with an air compressor 230 configured to supply compressed air to the system, although it will be recognized that other forms of gas may be used to transfer the nanofibers through system 150.

System 150 comprises one or more pumps for moving the clusters of nanofibers and eventually the individual nanoparticles throughout the system. Pumps may comprise any suitable pump, such as positive-displacement, centrifugal, axial-flow and the like. In one embodiment, a first pump 240 includes a first inlet fluidly coupled to air compressor 230 by a first passage 242 and a second inlet fluid coupled to separator 210 by a second passage 244. Compressed air is drawn into first pump 240, which creates a negative pressure (e.g., a vacuum) to draw clusters of nanofibers from separator 210 into pump (discussed in more detail below). System 150 may further include second and third pumps 250, 260 each fluidly coupled to the outlet of first pump 240. In a similar fashion, second and third pumps 250, 260 create negative pressures that draw the clusters of nanofibers through a third passage 252.

In certain embodiments, pumps 240 comprise eductors 300. As shown in FIG. 15, eductors 300 each comprise a motive fluid inlet 302 and a nanofiber inlet 304 coupled to an outlet 306 via a fluid passage 308. Fluid passage 308 includes a converging inlet nozzle 310, a diffuser throat 312 and a diverging outlet diffuser 314. High-pressure, low-velocity air is converted to low-pressure high-velocity air, thus producing the pressure difference required for suction. Based on the venturi effect and the Bernoulli principle, the primary fluid medium (e.g., compressed air) is used to create a vacuum to draw the nanofibers into the eductor 300 and to expel them through outlet 306. The diameter of the eductor 300 depends on the volumetric flow rate of the compressed air, the suction requirement, the pressure drop, and the fluid pressure of the compressed air.

Referring back to FIG. 13, third passage 252 includes a junction 254 that splits third passage 252 into two separate passages, each leading to second and third pumps 250, 260. Junction 254 preferably includes a surface or wall that is disposed substantially perpendicular to third passage 252 to form a T-shaped intersection. The surface may by any surface that opposes the flow of the nanofibers through the passage, such as the inner walls of the passage at a junction point, or other change in direction of the inner walls, e.g., a curved surface, a perpendicular surface or the like. Alternatively, the passage may include walls or other surfaces disposed within passage, or projecting into the passage in the fluid path. In one embodiment, the passage extends into a substantially T-shaped junction that includes two separate passages extending from the junction. The second eductor is configured to draw the nanofibers into the T-shaped junction at a velocity sufficient to break apart at least some of the nanofibers.

As the clusters of nanofibers move through third passage 252, they are propelled against this surface or wall by the negative pressure applied by second and third pumps 250, 260. This velocity of the nanofibers against junction 254 creates a collision with sufficient kinetic energy to cause at least some of the clusters of nanofibers to break up into smaller clusters of nanofibers and/or into individual nanoparticles having at least one dimension less than 1 micron.

In order to create the necessary kinetic energy to break down the clusters of nanofibers, the air is propelled throughout system 150 at a velocity of about 500 feet/minute (fpm) to about 10,000 feet/minute, preferably about 2,000 fpm to about 6,000 fpm. The system 150 includes a sufficient amount of suction pressure, preferably at least about 20 psi. This suction pressure creates an overall pressure throughout the system of at least about 100 psi.

In certain embodiments, system 150 further includes fourth and fifth fluid passages 262, 264 that couple the outlets of second and third pumps 250, 260 with a reactor 270. As shown in FIG. 16, reactor 270 comprises a top surface 272, a bottom surface 274 and an internal annular chamber 276 extending from top surface 272 to bottom surface 274. Reactor 270 further includes a central tube 275 having an open upper inlet 278 and an outlet 280. Reactor 270 may further include one or more upper outlet(s) 282. Reactor 270 may be coupled to a source of energy (not shown) that is configured to create a vortex of swirling gas within annular chamber 276. The source of energy may comprise any suitable energy source, such as a pump, compressor, generator and the like. The swirling gas preferably flows around central tube 275 from the bottom of reactor 270 to the top to move the clusters of nanofibers and the individual nanoparticles upwards from bottom surface 275 towards top surface 272.

In another embodiment, the vortex is created without a separate source of energy. In this embodiment, the clusters of nanofibers 290 and individual nanoparticles 292 enter the reactor 270 through bottom inlets 284, 285, 286, 287. Inlets 284, 285, 286, 287 are angled upwards to facilitate movement of the nanofibers and nanoparticles around central tube 275. In a preferred embodiment, at least one or more of the inlets 284, 285, 286, 287 is angled such that the nanofibers and nanoparticles enter the reactor 270 such that they are substantially tangential to central tube 275. Once they have entered annular chamber 276, the velocity vector (speed and direction) of the nanofibers and nanoparticles creates a vortex within reactor 270 that causes them to swirl around central tube 275 and upwards to the upper portion of chamber 276. The swirling gas preferably flows around central tube 275 from the bottom of reactor 270 to the top to move the clusters of nanofibers and the individual nanoparticles upwards from bottom surface 275 towards top surface 272. Without any interruption, the nanofibers 290 and nanoparticles 292 are blown from bottom of the reactor to the top. The vortex within chamber 276 may further break down (e.g., open up, separate and/or individualize) the clusters of nanofibers 290 as they pass through reactor 270.

In some embodiments, reactor 270 may also be coupled to a source of energy (not shown) that is configured to create the vortex of swirling gas within annular chamber 276. The source of energy may comprise any suitable energy source, such as a pump, compressor, generator and the like.

The system 100 may further include another pump or source of negative pressure (see, for example, FIG. 17) coupled to upper outlet 282. This negative pressure draws fibers through outlet 282 such that the fibers 290 exit the reactor 270. Since the individual nanoparticles 292 are significantly lighter than the entangled nanofibers 290 that are still clustered together, these individual nanoparticles 292 are drawn into upper inlet 278 of central tube 275. Meanwhile, the larger and heavier clusters of nanofibers 290 that have not yet been broken down are drawn through upper outlet 284. Upper outlet 284 may be coupled to other pumps (not shown), or to first pump 240. In this manner, the clusters of nanofibers 290 are sent through the process again to become further broken down, creating a refeed system to further break down the remaining clusters of nanofibers.

Outlet 280 of central tube 275 is coupled to nozzle 220 (see FIG. 13). The individual nanoparticles 292 are drawn into nozzle 220, where they are dispersed onto a surface of the substrate or into a fiber stream (discussed below). Nozzle 220 may comprise any suitable nozzle known by those in the art. In one embodiment, nozzle 220 has a plurality of outlets having an outer dimension tailored for the size (i.e., area) of the substrate passing below nozzle 220. The nozzle 220 will disperse the nanoparticles onto the substrate at a rate that is driven by the pressure throughout the system.

In certain embodiments, system 100 comprises more than one nozzle coupled to the outlet 280 of reactor 270. The nozzles may be arranged in any suitable form over the substrate, e.g., side-by side, in series, in parallel, or the like.

It will be recognized that pump 240, or pumps 250, 260 may directly feed the nanofiber/air mixture stream into the nozzle 220 (i.e., bypassing reactor 270). In this embodiment, the pressure within system is designed to create sufficient kinetic energy to break down or open up substantially all of the nanofibers into individual nanoparticles such that reactor 270 is not required to separate the nanoparticles from the larger clusters of fibers.

Figure 17:
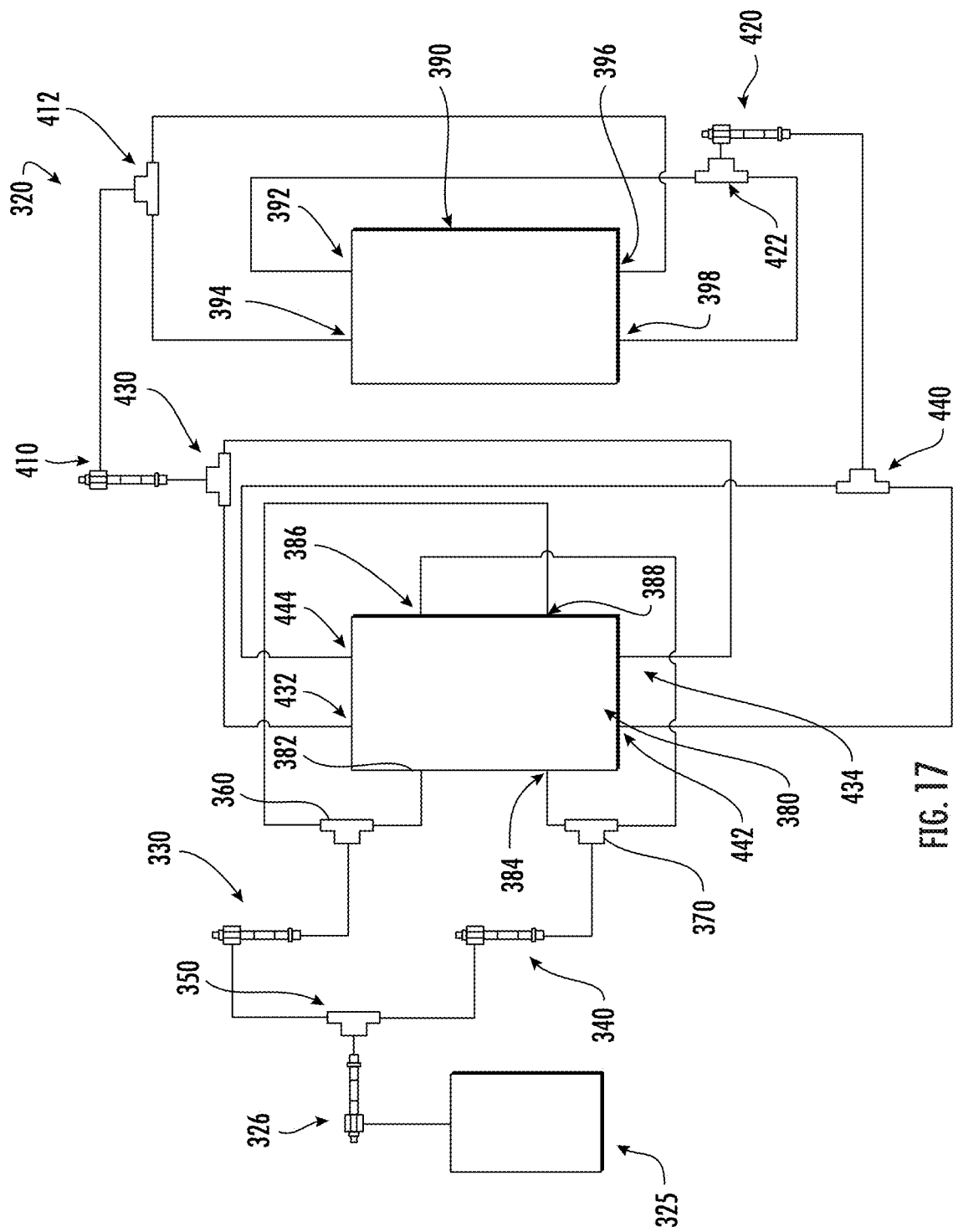
FIG. 17 illustrates another embodiment of a system for converting clusters of nanofibers into individual nanoparticles

Referring now to FIG. 17, another embodiment of a fiberization system 320 will now be described. As shown, fiberization system 320 includes a separator 325 for separating larger or macro clusters of nanofibers into the smaller clusters of nanofibers that will pass through system 320. A first eductor 326 is coupled to an outlet of separator 325 and serves to draw the nanofibers from separator 325 and into system 320. An air compressor (not shown) is also coupled to eductor 326 to provide the motive fluid, as discussed above.

Similar to the previous embodiment, second and third eductors 330, 340 are coupled to an outlet of the first eductor 326. The nanofibers are drawn through first eductor 320 and propelled against a surface of a T-shaped intersection 350 to break down at least some of the nanofibers into smaller clusters or individual nanoparticles.

Each of the second and third eductors 330, 340 have outlets coupled to additional T-shaped intersections 360, 370. As before, nanofibers are propelled against the surface of the T-shaped intersection 360, 370 to further break them down. The T-shaped intersections 360, 370 are each coupled to two fluid passages that enter the bottom portion 380 of a reactor. Thus, bottom portion 380 of reactor has four separate inlets 382, 384, 386, 388 for passage of the nanofibers. Each of these inlets is preferably angled upwards and positioned in opposite corners of the reactor. This allows the nanofibers to enter into the vortex of the reactor and then swirl upwards to an upper portion 390 of the reactor.

As discussed previously in reference to FIG. 16, the reactor includes an annular chamber with a central tube having an open upper end and a lower end coupled to a nozzle. The nanofibers that have been sufficiently broken down into individual nanoparticles flow through this open upper end and into the central tube for dispersion through the nozzle. The heavier clusters of nanoparticles that have not yet been broken down exit the reactor through one of four separate outlets 392, 394, 396, 398. Eductors 410, 420 provide the motive force for drawing the nanofibers from reactor 400, as discussed above. Outlets 392, 394 are each coupled to eductor 410 via a T-shaped intersection 412 and outlets 396, 398 are each coupled to eductor 420 via a T-shaped intersection 422. In this case, the nanofibers flow from two passages into one passage as they pass through intersections 412, 422.

Eductors 410, 420 are each coupled to T-shaped intersections 430, 440. As described before, the nanofibers are propelled into T-shaped intersections 430, 440 to further break them down into individual nanoparticles. T-shaped intersections 430, 440 are then each coupled to the bottom portion 380 of reactor 400 (via inlets 432, 434, 442, 444). This allows the nanofibers to pass back into reactor 400 for further processing. This process continues for each cluster of nanofibers until it has been entirely broken down into nanoparticles and passed through the central tube into the nozzle. As a last step, individualized nanofibers are air sprayed from the nozzle onto any substrate or mixed with any fiber spinning stream. During this process, suction is up to 20 psi, pressure is up to 100 psi.

In certain embodiments, fiberization system 150 may include a separate control system that monitors the nanofibers to determine when they have been broken down into individual nanoparticles suitable for passing through nozzle. The control system may, for example, simple monitor the pressure throughout the system to ensure that sufficient pressure is being applied to the nanofibers to break them down into nanoparticles. Alternatively, this control system may comprise a variety of different sensors disposed through the system to detect characteristics of the nanoparticles, such as weight or size. The sensors may be disposed, for example within reactor 400 such that the control system may control various parameters of reactor 400, such as the negative pressure applied to outlets, 392, 394, 396, 398, the speed of the vortex passing around the annular chamber, or the pressure applied to central tube that draws then nanoparticles into the nozzle.

Figure 18:
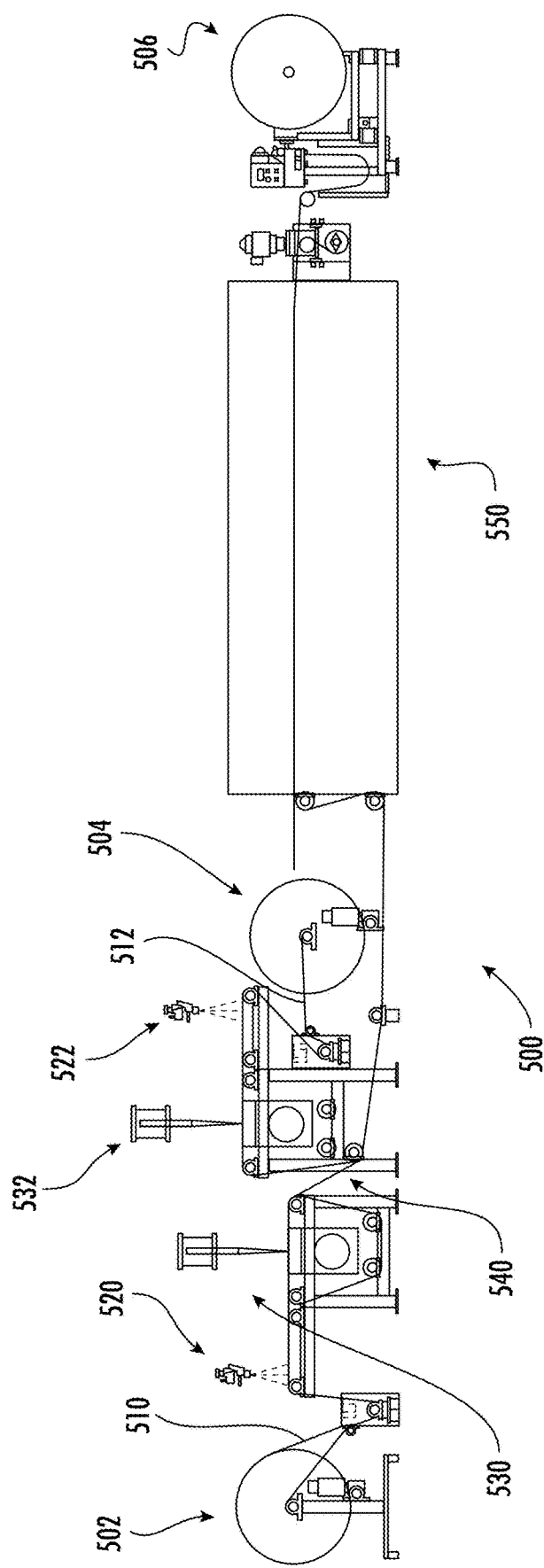
FIG. 18 illustrates a system for manufacturing a dual-layer fibrous material.

FIG. 18 illustrates another embodiment of a system 500 for manufacturing multiple layers of fibrous material. As shown, system 500 comprises first and second unwinders 502, 504 and a single winder 506 for winding first and second substrates 510, 512 downstream through system 500. As in previous embodiments, system 500 may further comprise a support surface (not shown) for each of the substrates 510, 512. First and second unwinders 502, 504 serve to advance the first and second substrates 510, 512 into the process, where they are joined together and then wound towards a single winder 506, as discussed below.

System 500 includes first and second spray coaters 520, 522, each positioned downstream of first and second unwinders 502, 504 for applying binding agents to the first and second substrates 510, 512. System 500 further includes first and second fiberization systems/devices 530, 532 positioned downstream of each of the spray guns 520, 522. As discussed previously, fiberization devices 530, 532 generate individual nanoparticles and disperse those nanoparticles onto substrates 510, 512.

Once the nanoparticles have been dispersed into substrates 510, 512, the two substrates are joined together at a junction point 540 such that they are advanced downstream together. The two substrates may be bonded to each other at this point, or they may simply be laid one on top of the other.

The system 500 further includes a heater/drying device, such as an IR oven 550, downstream of the junction point 540 of the two substrates. The heating/drying device heats and dries the two substrates to bond them to each other and to bond the nanoparticles to the fibers within the substrates. The substrates may, for example, be laminated to each other.

In certain embodiments, nanoparticles are dispersed into both of the substrates 510, 512. In one such embodiment, system 500 is designed such that nanoparticles are dispersed through first surfaces of each of the substrates. The substrates can then be joined such that the first surfaces are facing each other. Alternatively, the first surfaces may be facing away from each other (i.e., joining the substrates at the second, opposing surfaces of each substrate). In yet another embodiment, a first surface of the first substrate is joined to a second surface of the second substrate.

Figure 19:
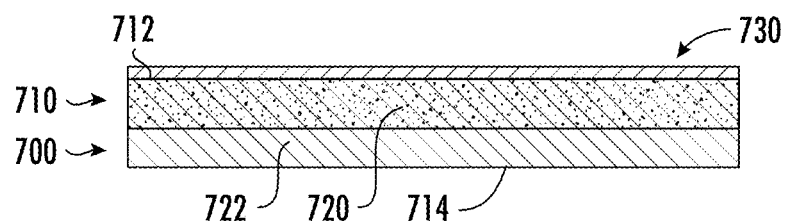
FIG. 19 illustrates a fibrous material with nanoparticles dispersed through a depth of the material.

FIG. 19 illustrates a filter product 700 including a filter media 710 of fibrous material including fibers 722 and nanoparticles 720 dispersed through at least a portion of filter media 710. As shown, filter media 710 has a first upper surface 712 and a second lower surface 714. The nanoparticles have been dispersed through upper surface 712 such that they extend beyond upper surface 712 and into the depth of filter media 710, as discussed above. Filter product 700 further includes a support layer 730, which may be any suitable support layer known in the art, such as a substantially rigid polymer that provides support for filter media 710, or an apertured film having a plurality of apertures for passage of gas or fluid therethrough (discussed above).

Figure 20:
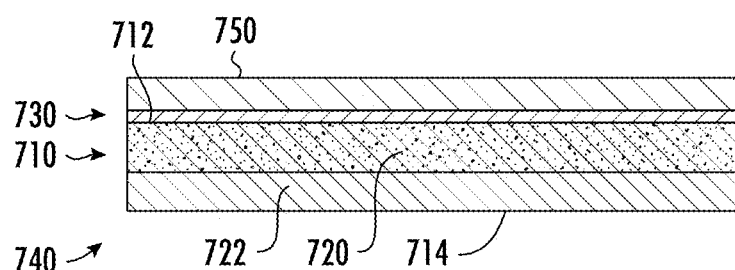
FIG. 20 illustrates a fibrous material with nanoparticles dispersed through a depth of the material and a scrim layer overlying the nanoparticles.

FIG. 20 illustrates another filter product 740 that includes a filter media 710 of fibrous material including fibers 722 and nanoparticles 720 dispersed through a portion of filter media 710. In this embodiment, product 740 includes a scrim layer 750 bonded to a support layer 730.

Figure 21:
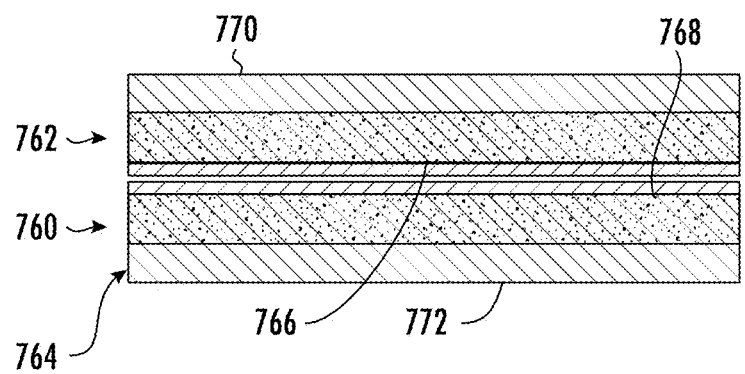
FIG. 21 illustrates a dual-layer fibrous material with nanoparticles dispersed onto inner surfaces of the two layers.

FIG. 21 illustrates a dual-layer filter product 760 that includes first and second filter medias 762, 764 bonded to each other. As shown, nanoparticles 720 have been dispersed throughout a depth of each filter media 762, 764. In this embodiment, nanoparticles 720 have been dispersed through inner surfaces 766, 768 of filter media 762, 764. In another embodiment (not shown), the nanoparticles are dispersed through outer surfaces 770, 772 of filter media 762, 764. In yet another embodiment, nanoparticles 720 may be deposited on inner surface 766 of media 762 and outer surface 772 of media 764.

In another aspect, a system for manufacturing a fibrous material comprises a first device for generating one or more streams of fibers and a second device for isolating nanoparticles within a gaseous medium. The second device disperses the nanoparticles into a stream and feeds this stream into the fiber stream(s) to form the fibrous material. The system may further include a dispersion device, such as a nozzle, coupled to the second device and configured to substantially uniformly feed the nanoparticles into the fiber stream(s). The fiber streams may be generated with any suitable mechanism known in the art, such as meltblown, spunbond or spunlace, heat-bonded, carded, air-laid, wet-laid, extrusion, co-formed, needlepunched, stitched, hydraulically entangled or the like.

In one example, the system may comprise a spunbond line, wherein filaments are formed by spinning molten polymer and stretching the molten filaments. Fiber bundles of filaments are separated and spread, and then and layered on a net to form a web. The fibers are bound in the form of a sheet through thermal bonding and embossing. First stream 630 may, for example, be introduced before the attenuation zone or before the bonding (consolidation) process.

In another embodiment, the system may comprise two carding machines disposed in-series with each other. First stream 630 may be introduced at any point after the first carding line and before the second carding line such that nanoparticles are sandwiched between two carding fiber webs. After that, all of the fibers including nanoparticles are bonded (nanoparticles are thermally interlocked) together in an air through bonding oven.

Figure 22:
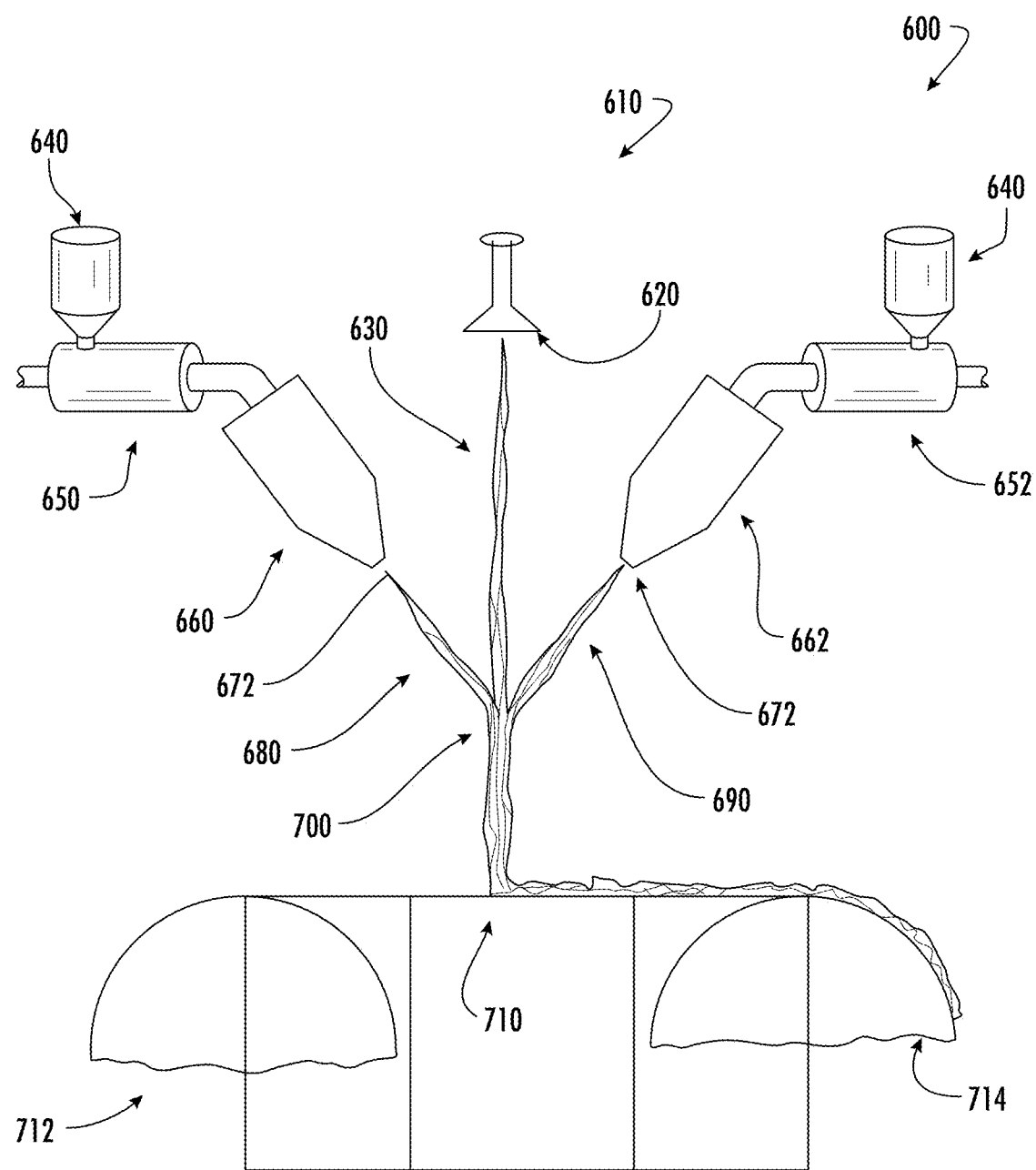
FIG. 22 illustrates an alternative embodiment of a system for manufacturing fibrous material in fluid streams.
Figure 23B:
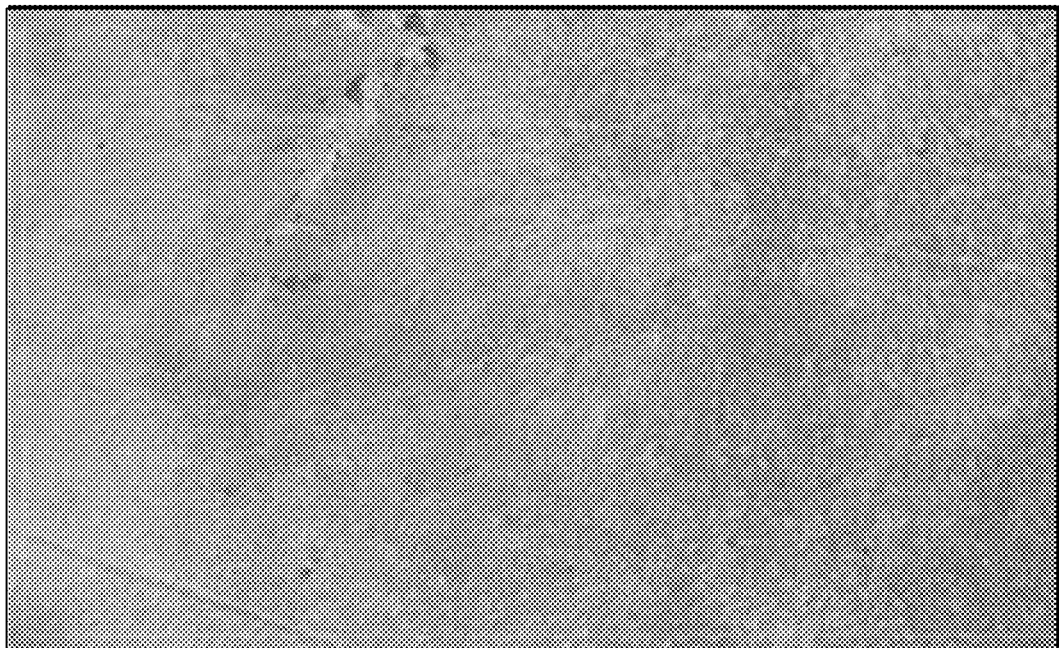
FIG. 23B is a photograph of a fibrous material with a binding agent.
Figure 23A:
FIG. 23A is a photograph of a fibrous material without using a binding agent.

Another embodiment for generating one or more fiber streams is illustrated in FIG. 22. In this embodiment, nanoparticles are dispersed between two meltblowing dies wherein melted polymers are pushed through small holes to make fibers. When the nanoparticles meet with the fibers while they are still tacky, they are mechanically entangled with the fibers and thermally bonded to the fibers. Thus, in some embodiments, there is no need for an additional bonding process.

As shown in FIG. 22, an apparatus 600 for forming a fibrous structure comprises a fiberization system 610 similar to one of the systems and devices described above. Fiberization system 610 includes a nozzle 620 or similar device for dispersing the individual nanoparticles into a first stream 630. Apparatus 600 further includes a system for generating one or more streams of fibers that will be combined with the stream 630 of individual nanoparticles. This system may comprise any known system in the art, such as spunbond, carded, extrusion and the like.

In another embodiment, apparatus comprises first and second feeders, such as hoppers 640, 642, coupled to first and second extruders 650, 652. Each extruder may, for example, comprise an extrusion screw (not shown) which is driven by a conventional drive motor (not shown). As the polymer advances through the extruders 650, 652, due to rotation of the extrusion screw by the drive motor, it is progressively heated to a molten state. Heating the thermoplastic polymer to the molten state may be accomplished in a plurality of discrete steps with its temperature being gradually elevated as it advances through discrete heating zones of the extruders 650, 652 toward two meltblowing dies 660, 662, respectively. The meltblowing dies 660, 662 may be yet another heating zone where the temperature of the thermoplastic resin is maintained at an elevated level for extrusion.

Each meltblowing die 660, 662 is configured so that two streams of attenuating gas per die converge to form a single stream of gas which entrains and attenuates molten threads, as the threads exit small holes or orifices 672 in the meltblowing die. The molten threads 20 are attenuated into fibers or, depending upon the degree of attenuation, microfibers, of a small diameter which is usually less than the diameter of the orifices 672. Thus, each meltblowing die 660, 662 has a corresponding single primary air stream 680, 690 of gas containing entrained and attenuated polymer fibers.

The primary air streams 680, 690 containing polymer fibers are aligned to converge at a formation zone 700. In addition, the first stream 630 of individual nanoparticles is added to the two primary air streams 680, 690 of thermoplastic polymer fibers or microfibers at the formation zone 30. Introduction of the individual nanoparticles into the two primary air streams 680, 690 of fibers is designed to produce a distribution of secondary fibrous materials 32 within the combined primary air streams 680, 690 of fibers. This may be accomplished by merging the first stream 630 of individual nanofibers between the two primary air streams 680, 690 so that all three gas streams converge in a controlled manner.

Examples of suitable meltblowing dies that may be utilized for manufacturing nonwoven materials are discussed in more detail in U.S. Pat. Nos. 6,972,104, 8,017,534 and 7,772,456 and US Patent Application No. US20200216979A1, the complete disclosures of which are incorporated herein by reference in their entirety for all purposes.

Example 1

A microfiber substrate of bicomponent fibers having an inner circular section of polyester, and an outer concentric section of HDPE was provided in a roll. In a roll to roll process, the substrate was sprayed with adhesive, and nanofibers of biosoluble glass fiber or nanoparticles were deposited. The nonwoven product was then heated in an oven, and the cooled nonwoven product was gathered onto another roll.

Nanoparticles are deposited according to processes described in FIGS. 12-16 below. In experiments, bio soluble glass nanofibers are used. Nanofiber diameter is about 700 nm while the length is about 500 microns. Carded air through bonded nonwovens made of bicomponent fibers are used as substrate in the following examples:

Flat sheet filter media samples tested at 110 fpm filtration velocity. Sample size was 12"×12". NaCl salt particles in the range of 0.3 to 10 micron were used as contaminants.

Example 2

A carded nonwoven made of 3 denier PET/PE bicomponent fiber is used as substrate. A composition comprising water, 2-hexoxyethanol, isopropanolamine, sodium dodecylbenzene sulfonate, lauramine oxide, ammonium hydroxide is used as binder. Different nanofiber add-on amounts are controlled via adjusting line speed.

TABLE 1

| Sample | Nanoparticle gsm | add-on gsm | Pressure drop "H20 | Particle Groups E1 | E2 | E3 | MERV Rating |
|---|---|---|---|---|---|---|---|
| Substrate | 54.9 | | 0.07 | 0 | 17 | 58 | 7 |
| A1 | 55.7 | 0.82 | 0.14 | 23 | 62 | 94 | 10 |
| A2 | 56.5 | 1.64 | 0.17 | 32 | 73 | 97 | 11 |
| A3 | 57.4 | 2.46 | 0.24 | 47 | 86 | 98 | 12 |

This example illustrates that by controlling the add-on amount of nanoparticles, MERV ratings are increasing from MERV 7 to up to MERV13.

Example 3

A high loft air through carded nonwoven with 5 denier bicomponent fiber is used as a substrate. A typical starch binder is diluted and sprayed before nanofiber deposition. Starch bonded nanofibers adequately as solvent evaporates and drying occurs under IR heater.

TABLE 2

| Sample | Pressure drop "H20 | Particle Groups E1 | E2 | E3 | MERV Rating |
|---|---|---|---|---|---|
| B1 | 0.1 | 24% | 58% | 88% | 10 |
| B2 | 0.17 | 34% | 71% | 90% | 11 |
| B3 | 0.26 | 47% | 85% | 98% | 12 |
| B4 | 0.29 | 59% | 91% | 99% | 13 |
| B5 | 0.5 | 76% | 97% | 100% | 14 |

Example 4

Spunbond or meltblown media were used as a substate with the nanoparticles being incorporated into the substrate as described herein after IPA discharge. The spunbond fibers were made from a melted polymer that was spun and drawn to produce filaments. The average basis weight of the substrates was about 90 gsm and the average thickness was about 0.57 mm. A base sample was used that did not incorporate any nanoparticles. 4 separate samples were prepared that included nanoparticles incorporated into the substrate as described herein. In sample 2, the nanoparticles were incorporated into meltblown fibers after IPA discharge. In samples 1, 3 and 4 the nanoparticles were incorporated into spunbond fibers after IPA discharge. The results of this testing are shown in Table 3 below.

TABLE 3

| Sample # | Substrate | PD | E1 | E2 | E3 | MERV |
|---|---|---|---|---|---|---|
| 1 | CAB81 (spunbond) | 0.41 | 96% | 100% | 100% | 16 |
| 2 | CAB81 (meltblown) | 0.24 | 75% | 98% | 100% | 14 |
| 3 | CAB81 (spunbond) | 0.40 | 92% | 100% | 100% | 15 |
| 4 | CAB81 (spunbond) | 0.17 | 48% | 87% | 99% | 12 |
| Base | CAB81 (spunbond) | 0.07 | 9% | 46% | 90% | 9 |

As shown, the efficiency of the filter media samples incorporating nanoparticles increased over the base sample in all three particle groups with significant increases in the E2 and E3 particles groups. The overall MERV ratings of the samples increased from MERV 7 (base sample) to MERV 12 to MERV 16 with nanoparticles. The base sample without nanoparticles had a pressure drop of 0.07 inches of water. Samples 1-4 had a slightly increased pressure drop ranging from 0.17 to 0.41 inches of water. In Sample 2, wherein the nanoparticles were incorporated into meltblown fibers, the MERV rating was 14 and the pressure drop was 0.24 inches of water.

Example 5

5 Denier air through carded fibers were used as a substrate. A base sample was used that did not incorporate nanoparticles. 2 separate samples were prepared that included nanoparticles incorporated into the substrate as described herein. The results of this testing are shown in Table 4 below.

TABLE 4

| Sample # | Substrate | PD | E1 | E2 | E3 | MERV |
|---|---|---|---|---|---|---|
| Base | 5D Fiber Carded | 0.03 | −1% | 2% | 38% | 6 |
| 1 | 5D Fiber Carded | 0.31 | 57% | 90% | 98% | 13 |
| 2 | 5D Fiber Carded | 0.33 | 61% | 92% | 98% | 13 |

As shown, the efficiency of the filter media samples incorporating nanoparticles increased substantially over the base sample in all three particle groups. The overall MERV ratings of the samples increased from MERV 6 (base sample) to MERV 13 with nanoparticles. The base sample without nanoparticles had a pressure drop of 0.03 inches of water. Samples 1 and had a slightly increased pressure drop ranging from 0.31 to 0.33 inches of water.

Example 6

Meltblown fibers were used as a substate. The substrates had an average basis weight of about 24 gsm and an average thickness of about 0.4 mm. A base sample was used that did not incorporate nanoparticles or an adhesive such as PVOH. Sample 1 included meltblown fibers with the belt up. PVOH was sprayed onto the fibers, but nanoparticles were not incorporated therein. sample 2 included meltblown fibers fuzzy side up. PVOH was sprayed onto the fibers, but nanoparticles were not incorporated therein. Sample 3 included meltblown fibers with PVOH sprayed thereon and nanoparticles incorporated into the fibers as described herein. The results of this testing are shown in Table 5 below.

TABLE 5

| Sample # | Substrate | PD | E1 | E2 | E3 | MERV |
|---|---|---|---|---|---|---|
| Base | Meltblown | 0.35 | 82% | 96% | 99% | 14 |
| 1 | Meltblown | 0.38 | 68% | 88% | 93% | 13 |
| 2 | Meltblown | 0.41 | 78% | 95% | 97% | 14 |
| 3 | Meltblown | 1.02 | 92% | 99% | 99% | 15 |

As shown, the efficiency of the sample 3 that incorporated nanoparticles increased over the other three base samples in all three particle groups, particularly in the E1 particle group. The overall MERV rating of sample 3 increased from MERV 13 or 14 (base samples) to MERV 15 with nanoparticles. The PVOH added to samples 2 and 3 did not substantially increase the pressure drop (i.e., 0.35 in the base sample and 0.38 and 0.41 in samples 1 and 2. The pressure drop of sample 3 did increase from a about 0.40 inches of water to about 1 inches of water. In Sample 3, wherein the nanoparticles where incorporated into the meltblown fibers, the MERV rating was 15 and the pressure drop was 1.02 inches of water.

Example 7

5 Denier air through carded fibers were used as a substate. A base sample was used that did not incorporate nanoparticles. Seven additional samples were prepared that included 5 Denier carded fibers with nanoparticles incorporated into the substrate as described herein. The results of this testing are shown in Table 6 below.

TABLE 6

| Sample # | Substrate | PD | E1 | E2 | E3 | MERV |
|---|---|---|---|---|---|---|
| Base | 5D Fiber Carded | 0.03 | −1% | 2% | 38% | 6 |
| 1 | 5D Fiber Carded | 0.07 | 7% | 31% | 69% | 7 |
| 2 | 5D Fiber Carded | 0.09 | 5% | 36% | 69% | 7 |
| 3 | 5D Fiber Carded | 0.15 | 16% | 51% | 77% | 9 |
| 4 | 5D Fiber Carded | 0.16 | 21% | 58% | 81% | 10 |
| 5 | 5D Fiber Carded | 0.17 | 31% | 70% | 90% | 11 |
| 6 | 5D Fiber Carded | 0.28 | 46% | 85% | 96% | 12 |
| 7 | 5D Fiber Carded | 0.32 | 58% | 91% | 97% | 13 |

As shown, the efficiency of the seven samples that incorporated nanoparticles increased over the base sample in all three particle groups, particularly in the E2 and E3 particle groups. The overall MERV ratings were increased from MERV 6 (base sample) to MERV 7 through MERV 13 with nanoparticles. The pressure drop only increased from 0.03 inches of water to a maximum of 0.32 in H20.

Example 8

High loft spunbond fibers were used as a substate in a continuous fiber line. This trial included two different versions: 205-6 and 205-2 in which the settings were changed on the continuous fiber line to produce two substrates with different weight and thicknesses. A base sample for each version (205-6 and 205-2) was used that did not incorporate nanoparticles. Six additional samples were prepared that included 205-6 and 205-2 fibers with nanoparticles incorporated into the substrate as described herein. The results of this testing are shown in Table 7 below.

TABLE 7

| Sample # | Substrate | PD | E1 | E2 | E3 | MERV |
|---|---|---|---|---|---|---|
| Base | 205-6 | 0.04 | 0% | 9% | 43% | 6 |
| Base | 205-2 | 0.04 | 0% | 8% | 37% | 6 |
| 1 | 205-6 | 0.86 | 88% | 98% | 99% | 15 |
| 2 | 205-2 | 0.48 | 79% | 96% | 99% | 14 |
| 3 | 205-6 | 0.87 | 82% | 97% | 99% | 14 |
| 4 | 205-2 | 0.42 | 61% | 90% | 98% | 13 |
| 5 | 205-6 | 0.78 | 79% | 97% | 99% | 14 |
| 6 | 205-2 | 0.23 | 44% | 79% | 96% | 11 |

As shown, the efficiency of the six samples that incorporated nanoparticles demonstrated substantially increased efficiency over the base sample in all three particle groups. The overall MERV ratings were increased from MERV 6 (base sample) to MERV 11 through MERV 14 with nanoparticles. The pressure drop only increased from 0.04 inches of water to a maximum of 0.87 inches of water. The pressure drops in the 205-2 samples only increased to a maximum of 0.48 in H2O.

Example 9

Spunbond and meltblown fibers were used as a substate. The average basis weight for the substrates was about 70 gsm for the spunbond fibers and about 24 gsm for the meltblown fibers The average thickness of the substrates was about 0.75 mm. A base sample was used that did not incorporate nanoparticles. Five additional samples were prepared that included spunbond plus meltblown fibers with nanoparticles into the fibers as described herein In samples 1-3, the nanoparticles were sprayed onto the meltblown fibers. In samples 4 and 5, the nanoparticles were sprayed onto the spunbond fibers. Also, in samples 1 and 2, the adhesive PVOH was not sprayed onto the substrate. PVOH was sprayed onto samples 3-5. The results of this testing are shown in Table 8 below.

TABLE 8

| Sample # | Substrate | PD | E1 | E2 | E3 | MERV |
| --- | --- | --- | --- | --- | --- | --- |
| Base | Spunbond + MB | 0.07 | 2% | 17% | 29% | 5 |
| 1 | Spunbond + MB | 0.41 | 100% | 100% | 100% | 16 |
| 2 | Spunbond + MB | 0.56 | 100% | 100% | 100% | 16 |
| 3 | Spunbond + MB | 0.26 | 99% | 100% | 100% | 16 |
| 4 | Spunbond + MB | 0.4 | 100% | 100% | 100% | 16 |
| 5 | Spunbond + MB | 0.17 | 97% | 100% | 100% | 16 |

As shown, the efficiency of the five samples that incorporated nanoparticles demonstrated substantially increased efficiency over the base sample in all three particle groups. The overall MERV ratings were increased from MERV 5 (base sample) to MERV 16 with nanoparticles. The pressure drop only increased from 0.07 inches of water to a maximum of 0.56 inches of water. In samples 3-5 (PVOH sprayed onto the substrate), the pressure drop only increased to a maximum of 0.4 inches of water.

Example 10

5 Denier air through carded glass fibers were used as a substate. A Base sample was used that did not incorporate nanoparticles. Three additional samples were prepared that included 5 Denier carded glass fibers with nanoparticles incorporated therein. The results of this testing are shown in Table 9 below.

TABLE 9

| Sample # | Substrate | PD | E1 | E2 | E3 | MERV |
| --- | --- | --- | --- | --- | --- | --- |
| Base | 5D fiber carded | 0.03 | −1% | 2% | 38% | 6 |
| 1 | 5D fiber carded | 0.27 | 59% | 91% | 99% | 13 |
| 2 | 5D fiber carded | 0.18 | 45% | 83% | 98% | 12 |
| 3 | 5D fiber carded | 0.24 | 54% | 89% | 99% | 13 |

As shown, the efficiency of the three samples that incorporated nanoparticles demonstrated substantially increased efficiency over the base sample in all three particle groups. The overall MERV ratings were increased from MERV 6 (base sample) to MERV 12 or MERV 13 with nanoparticles. The pressure drop only increased from 0.03 inches of water to a maximum of 0.27 inches of water.

Example 11

A fiber blend of 5 Denier and 7 Denier air through carded glass fibers were used as a substrate. The media was air through bonded. A Base sample was used that did not incorporate nanoparticles. Nineteen additional samples were prepared that included a fiber blend of 5 Denier and 7 Denier carded glass fibers with nanoparticles incorporated therein. The results of this testing are shown in Table 10 below.

TABLE 10

| Sample # | Substrate | PD | E1 | E2 | E3 | MERV |
| --- | --- | --- | --- | --- | --- | --- |
| Base | 5D/7D carded | 0.03 | −1% | 2% | 38% | 6 |
| 1 | 5D/7D carded | 0.15 | 37% | 64% | 95% | 10 |
| 2 | 5D/7D carded | 0.21 | 33% | 70% | 92% | 11 |
| 3 | 5D/7D carded | 0.17 | 42% | 80% | 98% | 11 |
| 4 | 5D/7D carded | 0.25 | 47% | 82% | 96% | 12 |
| 5 | 5D/7D carded | 0.20 | 48% | 84% | 98% | 12 |
| 6 | 5D/7D carded | 0.22 | 49% | 84% | 98% | 12 |
| 7 | 5D/7D carded | 0.23 | 53% | 85% | 97% | 13 |
| 8 | 5D/7D carded | 0.23 | 53% | 87% | 98% | 13 |
| 9 | 5D/7D carded | 0.23 | 54% | 88% | 98% | 13 |
| 10 | 5D/7D carded | 0.27 | 54% | 88% | 98% | 13 |
| 11 | 5D/7D carded | 0.28 | 54% | 87% | 98% | 13 |
| 12 | 5D/7D carded | 0.24 | 56% | 89% | 98% | 13 |
| 13 | 5D/7D carded | 0.26 | 56% | 88% | 98% | 13 |
| 14 | 5D/7D carded | 0.25 | 57% | 90% | 98% | 13 |
| 15 | 5D/7D carded | 0.27 | 57% | 89% | 98% | 13 |
| 16 | 5D/7D carded | 0.28 | 57% | 89% | 98% | 13 |
| 17 | 5D/7D carded | 0.28 | 58% | 90% | 98% | 13 |
| 18 | 5D/7D carded | 0.30 | 58% | 90% | 98% | 13 |
| 19 | 5D/7D carded | 0.29 | 59% | 89% | 98% | 13 |
| 20 | 5D/7D carded | 0.31 | 65% | 94% | 99% | 13 |

As shown, the efficiency of all 19 samples that incorporated nanoparticles demonstrated substantially increased efficiency over the base sample in all three particle groups. The overall MERV ratings were increased from MERV 6 (base sample) to MERV 10 through MERV 13 with nanoparticles (the majority of the samples were rated at MERV 13). The pressure drop only increased from 0.03 inches of water to a maximum of 0.31 inches of water.

While the devices, systems and methods have been described in detail herein in accordance with certain preferred embodiments thereof, many modifications and changes therein may be effected by those skilled in the art.

Accordingly, the foregoing description should not be construed to be limited thereby but should be construed to include such aforementioned obvious variations and be limited only by the spirit and scope of the following claims.

For example, in a first aspect, a first embodiment comprises a method for manufacturing a fibrous material. The method comprises providing a first stream of fibers, generating a second stream of nanoparticles, wherein the nanoparticles have at least one dimension less than 1 micron and combining the first and second streams to form the fibrous material.

A second embodiment is the first embodiment and further comprising substantially uniformly feeding the nanoparticles into the first stream of fibers.

A third embodiment is any combination of the first 2 embodiments and further comprising forming the fibrous material such that the fibers and the nanoparticles are mixed together substantially uniformly throughout the material.

A $4^{th}$ embodiment is any combination of the first 3 embodiments and further comprising heating and extruding fiber filaments to form the first stream of fibers.

A $5^{th}$ embodiment is any combination of the first 4 embodiments and further comprising stretching and separating the fiber filaments.

A $6^{th}$ embodiment is any combination of the first 5 embodiments and further comprising forming the first steam of fibers with a carding machine.

A $7^{th}$ embodiment is any combination of the first 6 embodiments and further comprising providing first and second carding machines and introducing the second stream of nanoparticles into the first stream of fibers between the first and second carding machines.

An $8^{th}$ embodiment is any combination of the first 7 embodiments and further comprising heating fibrous material to a molten state and extruded the fibrous material to form molten threads of fibrous material, forming first and second streams of molten threads and aligning the first and second streams of molten threads at a formation zone.

A $9^{th}$ embodiment is the $8^{th}$ embodiment and further comprising converging the second stream of individual nanofibers with the first and second streams of molten threads at the formation zone.

A $10^{th}$ embodiment is any combination of the first 9 embodiments wherein the nanoparticles are isolated within a gaseous medium.

An $11^{th}$ embodiment is any combination of the first 10 embodiments and further comprising mechanically separating macro clusters of nanofibers into groups of nanofibers.

A $12^{th}$ embodiment is any combination of the first 11 embodiments and further comprising converting the groups of nanofibers into individual nanoparticles.

A $13^{th}$ embodiment is any combination of the first 12 embodiments and further comprising applying negative pressure to the groups of nanofibers to draw the groups of nanofibers into a stream of compressed air.

A $14^{th}$ embodiment is any combination of the first 13 embodiment and further comprising propelling the groups of nanofibers against a surface to break up at least one portion of the groups of nanofibers into the nanoparticles.

A $15^{th}$ embodiment is any combination of the first 14 embodiments wherein the groups of nanofibers are propelled into the surface at a rate of about 2,000 to about 6,000 feet per minute.

A $16^{th}$ embodiment is any combination of the first 15 embodiments and further comprising separating the nanoparticles from the groups of nanofibers.

A $17^{th}$ embodiment is any combination of the first 16 embodiments and further comprising applying a vortex to the groups of nanofibers and the nanoparticles and applying negative pressure to draw the groups of nanofibers away from the nanoparticles.

An $18^{th}$ embodiment is any combination of the first 17 embodiments and further comprising dispersing the nanoparticles into the second stream of fibers.

A $19^{th}$ embodiment is any combination of the first 18 embodiments and further comprising converting the fibrous material into a filter.

A $20^{th}$ embodiment is a fibrous material formed from any combination of the first 19 embodiments.

A $21^{st}$ embodiment is a filter media formed from any combination of the first 19 embodiments.

In a second aspect, a first embodiment is a system for manufacturing a fibrous material. The system comprises a first device for generating one or more streams of fibers, a second device for isolating nanoparticles within a gaseous medium, wherein the nanoparticles have at least one dimension less than 1 micron, and wherein the second device forms the nanoparticles into a stream and feeds the stream into the one or more streams of fiber to form the fibrous material.

A second embodiment is the first embodiment and further comprising a nozzle configured to substantially uniformly feed the nanoparticles into the one or more streams of fibers.

A third embodiment is any combination of the first two embodiments wherein the nozzle feeds the nanoparticles into the streams of fibers at a rate that mixes the nanoparticles substantially uniformly throughout the fibers.

A $4^{th}$ embodiment is any combination of the first 3 embodiments wherein the first device comprises a spunbond device comprising one or more extruders configured to heat and extrude fiber filaments and a spinning block coupled to the extruders.

A $5^{th}$ embodiment is any combination of the first 4 embodiments wherein the first device comprises a carding machine.

A $6^{th}$ embodiment is any combination of the first 5 embodiments and further comprising first and second carding devices and wherein the second device disperses the nanoparticles between the first and second carding devices.

A $7^{th}$ embodiment is any combination of the first 6 embodiments wherein the first device comprises first and second melt blown dies configured to heat the fibrous material to a molten state and to extrude the fibrous material to form molten threads of fibrous material.

An $8^{th}$ embodiment is the $7^{th}$ embodiment wherein the first and second melt blown dies are aligned to generate first and second fiber streams and to combine the first and fiber streams at a formation zone.

A $9^{th}$ embodiment is the $8^{th}$ embodiment wherein the nozzle is aligned to converge the stream of individual nanoparticles with the first and second fiber streams at the formation zone.

A $10^{th}$ embodiment is any combination of the first 9 embodiments wherein the second device comprises a separator for mechanically separating macro clusters of nanofibers into clusters of nanofibers.

An $11^{th}$ embodiment is any combination of the first 10 embodiments wherein the second device comprises a source of compressed air, a pump, a first passage coupling the source of compressed air to the pump and a second passage coupling the separator with the pump.

A $12^{th}$ embodiment is any combination of the first 11 embodiments wherein the pump comprises an eductor configured to generate a negative pressure to draw the small clusters of nanofibers from the separator and through the second passage.

A 13th embodiment is any combination of the first 12 embodiments further comprising a source of energy coupled to the eductor, a third passage coupled to the eductor and a surface within the third passage, wherein the source of energy is configured to propel the small clusters of nanofibers against the surface to convert at least some of the small clusters of nanofibers into individual nanoparticles.

A 14th embodiment is any combination of the first 13 embodiments wherein the clusters of nanofibers are propelled at a rate of about 2,000 to about 6,000 feet per minute.

A 15th embodiment is any combination of the first 14 embodiments wherein the source of energy comprises a second pump configured to draw the small clusters of nanofibers against the surface to break down the small clusters of nanofibers into individual nanoparticles.

A 16th embodiment is any combination of the first 15 embodiments and further comprising a reactor having an internal chamber coupled to the third passage, wherein the reactor is configured to separate the individual nanoparticles from the clusters of nanofibers.

A 17th embodiment is any combination of the first 16 embodiments, wherein the internal chamber of the reactor comprises one or more inlets coupled to the passage, and wherein the pump is configured to propel the individual fibers and the clusters of nanofibers through the inlets with a velocity vector that creates a vortex within the reactor.

An 18th embodiment is any combination of the first 17 embodiments, wherein the internal chamber includes a substantially central tube and the velocity vector includes a direction that it transverse to a longitudinal axis of the tube.

A 19th embodiment is any combination of the first 18 embodiments, wherein the central tube comprises a substantially cylindrical outer surface with an upper opening, wherein the individual fibers and the clusters of nanofibers are propelled in the vortex around the outer surface of the central tube.

A 20th embodiment is any combination of the first 19 embodiments, wherein the individual nanoparticles are drawn into the upper opening of the central tube.

A 21st embodiment is any combination of the first 20 embodiments wherein the internal chamber comprises one or more outlets at an opposite end of the internal chamber from the one or more inlets, the system further comprising a source of energy coupled to the outlets and configured to apply a negative pressure to the chamber to draw the clusters of nanofibers through the outlets.

A 22nd embodiment is any combination of the first 21 embodiments wherein the fibrous material comprises a filter media.

What is claimed is:

1. A system for manufacturing a fibrous material, the system comprising:
   a first device for generating one or more streams of fibers;
   a second device for isolating individual nanoparticles within a gaseous medium; and
   a third device coupled to the second device and configured to receive isolated nanoparticles from the second device, form the nanoparticles into a stream and feed the stream into the one or more streams of fiber to form the fibrous material.

2. The system of claim 1, wherein the third device comprises a nozzle configured to substantially uniformly feed the nanoparticles into the one or more streams of fibers.

3. The system of claim 2, wherein the nozzle feeds the nanoparticles into the streams of fibers at a rate that mixes the nanoparticles substantially uniformly throughout the fibers.

4. The system of claim 1, wherein the first device comprises a spunbond device comprising one or more extruders configured to heat and extrude fiber filaments and a spinning block coupled to the extruders.

5. The system of claim 1, wherein the first device comprises a carding machine.

6. The system of claim 5, further comprising first and second carding devices, wherein the second device disperses the nanoparticles between the first and second carding devices.

7. The system of claim 1, wherein the first devices comprise first and second melt blown dies configured to heat the fibrous material to a molten state and to extrude the fibrous material to form molten threads of fibrous material.

8. The system of claim 7, wherein the first and second melt blown dies are aligned to generate first and second fiber streams and to combine the first and fiber streams at a formation zone.

9. The system of claim 8, wherein the nozzle is aligned to converge the stream of individual nanoparticles with the first and second fiber streams at the formation zone.

10. The system of claim 1, wherein the second device comprises:
    a source of compressed air;
    a pump;
    a separator;
    a first passage coupling the source of compressed air to the pump; and
    a second passage coupling the separator with the pump.

11. A system for manufacturing a fibrous material, the system comprising:
    a first device for generating one or more streams of fibers;
    a second device for isolating nanoparticles within a gaseous medium, the second device comprising:
       a housing configured to contain groups of nanofibers,
       a pump coupled to the housing; and
       a passage coupled to the pump and having a surface, wherein the pump is configured to propel the groups of nanofibers into the surface; and
    a third device configured to feed the nanoparticles into the one or more streams of fiber to form the fibrous material.

12. The system of claim 11, wherein the pump propels the groups of nanofibers into the surface at a sufficient velocity to generate individual nanoparticles from at least a portion of the groups of nanofibers.

13. The system of claim 12, wherein the velocity is about 500 feet/minute (fpm) to about 10,000 fpm.

14. The system of claim 11, further comprising:
    a source of compressed air; and
    a passage coupling the source of compressed air to the pump.

15. The system of claim 14, wherein the pump comprises an eductor configured to generate a negative pressure to draw the groups of nanofibers from the housing and through the first passage.

16. The system of claim 15, further comprising:
    a reactor having an internal chamber coupled to the passage;
    wherein the reactor is configured to separate the individual nanoparticles from the groups of nanofibers.

17. The system of claim 16, wherein the internal chamber of the reactor comprises one or more inlets coupled to the passage, and wherein the pump is configured to propel the individual nanoparticles and the nanofibers through the inlets with a velocity vector that creates a vortex within the reactor.

18. The system of claim 11, wherein the first device comprises a spunbond device comprising one or more extruders configured to heat and extrude fiber filaments and a spinning block coupled to the extruders.

19. The system of claim 11, wherein the first device comprises a carding machine.

20. The system of claim 11, wherein the first devices comprise first and second melt blown dies configured to heat the fibrous material to a molten state and to extrude the fibrous material to form molten threads of fibrous material.

* * * * *